US010956832B2

(12) United States Patent
Yang et al.

(10) Patent No.: US 10,956,832 B2
(45) Date of Patent: Mar. 23, 2021

(54) TRAINING A DATA CENTER HARDWARE INSTANCE NETWORK

(71) Applicant: Platina Systems Corporation, Santa Clara, CA (US)

(72) Inventors: Frank Szu-Jen Yang, Cupertino, CA (US); Ramanagopal V. Vogety, San Ramon, CA (US); Sharad Mehrotra, Saratoga, CA (US)

(73) Assignee: Platina Systems Corporation, Santa Clara, CA (US)

( * ) Notice: Subject to any disclaimer, the term of this patent is extended or adjusted under 35 U.S.C. 154(b) by 436 days.

(21) Appl. No.: 16/016,362

(22) Filed: Jun. 22, 2018

(65) Prior Publication Data

US 2019/0392354 A1 Dec. 26, 2019

(51) Int. Cl.
*G06N 20/00* (2019.01)
*G06F 3/06* (2006.01)
*G06N 5/04* (2006.01)

(52) U.S. Cl.
CPC ............. *G06N 20/00* (2019.01); *G06F 3/065* (2013.01); *G06F 3/067* (2013.01); *G06F 3/0619* (2013.01); *G06N 5/04* (2013.01)

(58) Field of Classification Search
CPC .......... G06N 20/00; G06N 5/04; G06N 5/003; G06N 7/005; G06F 3/0619; G06F 3/065; G06F 3/067; G06F 2209/508; G06F 9/5072
USPC ......................................................... 706/12
See application file for complete search history.

(56) References Cited

U.S. PATENT DOCUMENTS

| 5,357,395 | A | 10/1994 | Bissell et al. |
| 6,002,340 | A | 12/1999 | Smith |
| 7,525,353 | B2 | 4/2009 | Wadhwa et al. |
| 7,925,081 | B2 * | 4/2011 | Gupta ............... G06K 9/00348 382/159 |
| 8,077,726 | B1 | 12/2011 | Kumar et al. |
| RE45,097 | E | 8/2014 | Iyer et al. |
| 9,092,223 | B1 | 7/2015 | Pani et al. |
| 9,106,527 | B1 | 8/2015 | Cook et al. |

(Continued)

FOREIGN PATENT DOCUMENTS

WO  WO-2019245850 A1  12/2019

OTHER PUBLICATIONS

"Amazon CloudWatch Developer Guide API Version Aug. 1, 2010", Retrieved from the Internet: <http://web.archive.org/web/20111009080335/http://awsdocs.s3.amazonaws.com/AmazonCloudWatch/latest/acw-dg.pdf>, (Jan. 1, 2011), 106 pgs.

(Continued)

*Primary Examiner* — Fernando Hidalgo
(74) *Attorney, Agent, or Firm* — Schwegman Lundberg & Woessner, P.A.

(57) ABSTRACT

A method is provided to produce training data set for training an inference engine to predict events in a data center comprising: producing probe vectors corresponding to components of a data center, each probe vector including a sequence of data elements, one of the probe vectors indicating an event at a component and at a time of the event; and producing at a master device a set of training snapshots, wherein each training snapshot includes a subsequence of data elements that corresponds to a time increment that matches or that occurred not later than the indicated time of occurrence of the event.

28 Claims, 11 Drawing Sheets

(56) References Cited

U.S. PATENT DOCUMENTS

| | | |
|---|---|---|
| 9,136,624 B1 | 9/2015 | Reynov et al. |
| 9,722,926 B2 | 8/2017 | Phaal |
| 9,898,069 B1 | 2/2018 | O'brien et al. |
| 10,038,572 B1 | 7/2018 | Seshadri |
| 10,139,894 B2 | 11/2018 | Yang et al. |
| 10,191,527 B2 | 1/2019 | Sandhu et al. |
| 10,386,913 B2 | 8/2019 | Yang et al. |
| 10,416,752 B2 | 9/2019 | Yang et al. |
| 2008/0117910 A1 | 5/2008 | Page |
| 2011/0185212 A1 | 7/2011 | Dao et al. |
| 2012/0076183 A1 | 3/2012 | Dapper et al. |
| 2012/0181869 A1 | 7/2012 | Chapel et al. |
| 2012/0297043 A1 | 11/2012 | Davis et al. |
| 2013/0325998 A1 | 12/2013 | Hormuth et al. |
| 2014/0050223 A1 | 2/2014 | Foo et al. |
| 2014/0101652 A1 | 4/2014 | Kamble et al. |
| 2014/0281057 A1 | 9/2014 | Cohen et al. |
| 2015/0092551 A1 | 4/2015 | Moisand et al. |
| 2015/0111421 A1 | 4/2015 | Rossman |
| 2015/0121529 A1 | 4/2015 | Quinlan et al. |
| 2015/0153799 A1 | 6/2015 | Lucas et al. |
| 2015/0169487 A1 | 6/2015 | Subramaniyan et al. |
| 2016/0154756 A1 | 6/2016 | Dodson et al. |
| 2016/0380455 A1 | 12/2016 | Greening et al. |
| 2017/0063783 A1 | 3/2017 | Yong et al. |
| 2017/0187846 A1 | 6/2017 | Shalev et al. |
| 2017/0269959 A1 | 9/2017 | Agarwal et al. |
| 2017/0285729 A1 | 10/2017 | Yang et al. |
| 2017/0286339 A1 | 10/2017 | Yang et al. |
| 2017/0289029 A1 | 10/2017 | Yang et al. |
| 2019/0056776 A1 | 2/2019 | Yang et al. |

OTHER PUBLICATIONS

"U.S. Appl. No. 15/476,673, Amendment under 37 C.F.R. 1.312 filed Jun. 14, 2019", 7 pgs.

"U.S. Appl. No. 15/476,673, Response to Rule 312 Communication dated Jul. 2, 2019", 2 pgs.

"U.S. Appl. No. 15/476,678, Advisory Action dated Jun. 27, 2019", 5 pgs.

"U.S. Appl. No. 15/476,678, Non Final Office Action date Nov. 19, 2019", 11 pgs.

"U.S. Appl. No. 15/476,678, Response filed Jun. 4, 2019 to Final Office Action dated Apr. 4, 2019", 5 pgs.

"Application Serial No. PCT/US2019/036974, International Search Report dated Aug. 21, 2019", 3 pgs.

"International Application Serial No. PCT/US2019/036974, Written Opinion dated Aug. 21, 2019", 9 pgs.

"U.S. Appl. No. 15/476,664, Notice of Allowance dated Jul. 20, 2018", 10 pgs.

"U.S. Appl. No. 15/476,673, Notice of Allowance dated Apr. 10, 2019", 10 pgs.

"U.S. Appl. No. 15/476,678, Final Office Action dated Apr. 4, 2019", 11 pgs.

"U.S. Appl. No. 15/476,678, Non Final Office Action dated Sep. 21, 2018", 9 pgs.

"U.S. Appl. No. 15/476,678, Response filed Feb. 20, 2019 to Non Final Office Action dated Sep. 21, 2018", 5 pgs.

"U.S. Appl. No. 16/166,443, Non Final Office Action dated Dec. 20, 2018", 8 pgs.

"U.S. Appl. No. 16/166,443, Notice of Allowance dated May 13, 2019", 16 pgs.

"U.S. Appl. No. 16/166,443, Preliminary Amendment filed Dec. 10, 2018", 6 pgs.

"U.S. Appl. No. 16/166,443, Response filed Mar. 19, 2019 to Non Final Office Action dated Dec. 20, 2018", 7 pgs.

Abts, Dennis, et al., High Performance Datacenter Networks: Architectures, Algorithms, and Opportunities, Morgan & Claypool, (2011), 115 pages.

Hwang, Kai, et al., "Chapter 7, Cloud Architecture and Datacenter Design", Distributed Computing: Clusters, Grids and Clouds, (2010), 57 pages.

"International Application Serial No, PCT/US2019/036974, International Preliminary Report on Patentability dated Dec. 30, 2020", 8 pgs.

* cited by examiner

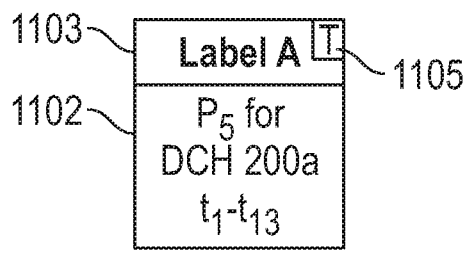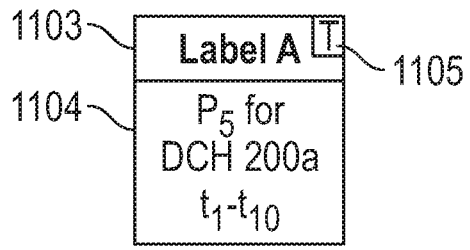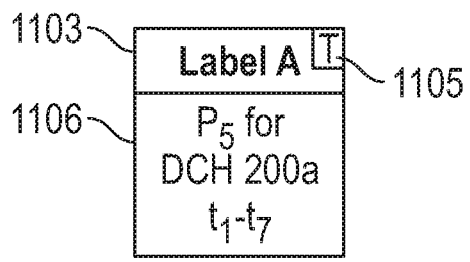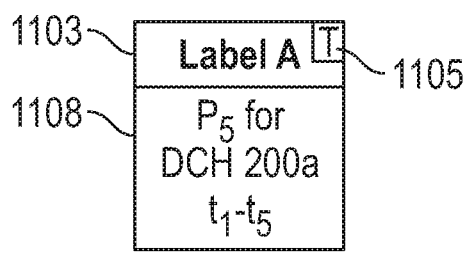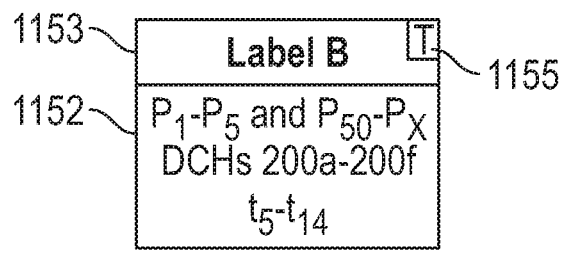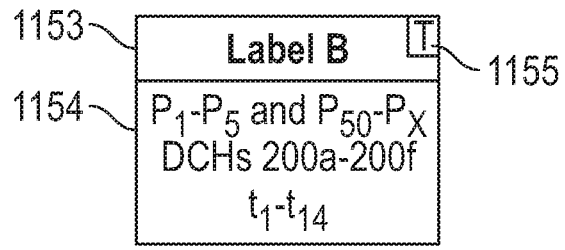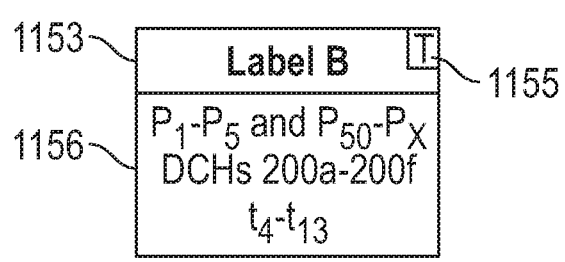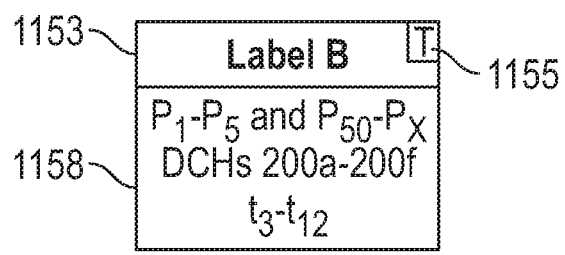
FIG. 11
FIG. 12

TRAINING A DATA CENTER HARDWARE INSTANCE NETWORK

BACKGROUND

A data center, at any scale, is complex to build, operate, and maintain. Combining the various types of technology and the skillsets, teams, tools, interoperability, is logistically challenging. Getting a data center to become fully operational may require incremental improvement over time. By the time the data center is fully operational, the complexity may be such that few persons understand all the pieces and a reconfiguration for business needs or the introduction of new technology may be equally or more challenging to scale than the original build.

Modern data centers typically include a network of servers that may provide client access to application workflows through any of a variety of Web protocols, language platforms, virtual machines that may provide users with full desktops, or containerized applications to provide microservices, for example. Typical data center hardware resources may include: servers, network components, and storage volumes. The servers manage application workflows and respond to client requests. Network switches couple data center servers to manage the workflows. Network routers perform packet forwarding functions. Network gateways may act as junctions between a data center network and the Internet. Storage volumes store information used by servers to serve application workflows. A data center may support numerous different application workflows.

Data center management involves monitoring data center workflow requirements and adjusting data center resource allocation to different application workflows in response to changes in client demands. A data center may include one or more controllers to configure, monitor, and partition hardware resources; an orchestrator that manages how software and services are deployed or distributed amongst the hardware resources; and the application software themselves that run within the data center. There are many data from these hardware resources, controllers, orchestrator, and applications that a data center operator monitors to manage resource allocation, trouble shoot, optimize performance, and plan for growth. These data typically are collected by tools focused in one or another functional area and interpreted by domain experts in that particular functional area. It is not difficult to aggregate all data from different functional areas and collect them in a large (perhaps gigantic) database, but the interpretation on such a large data set may become exponentially challenging not only due to the size of the data, but the complexity and the cross-domain knowledge required to make use of the data. As data centers grow in size and complexity, humans alone are increasingly challenged in making use of these data in a useful real-time manner.

BRIEF DESCRIPTION OF THE DRAWINGS

FIG. 11 is an illustrative drawing representing an example snapshot data structure including a first set of self-labeled labeled probe vector snapshot training data, in accordance with some embodiments.

FIG. 12 is an illustrative drawing representing an example snapshot data structure including a second set of self-labeled labeled probe vector snapshot training data, in accordance with some embodiments.

SUMMARY

Figure 1:
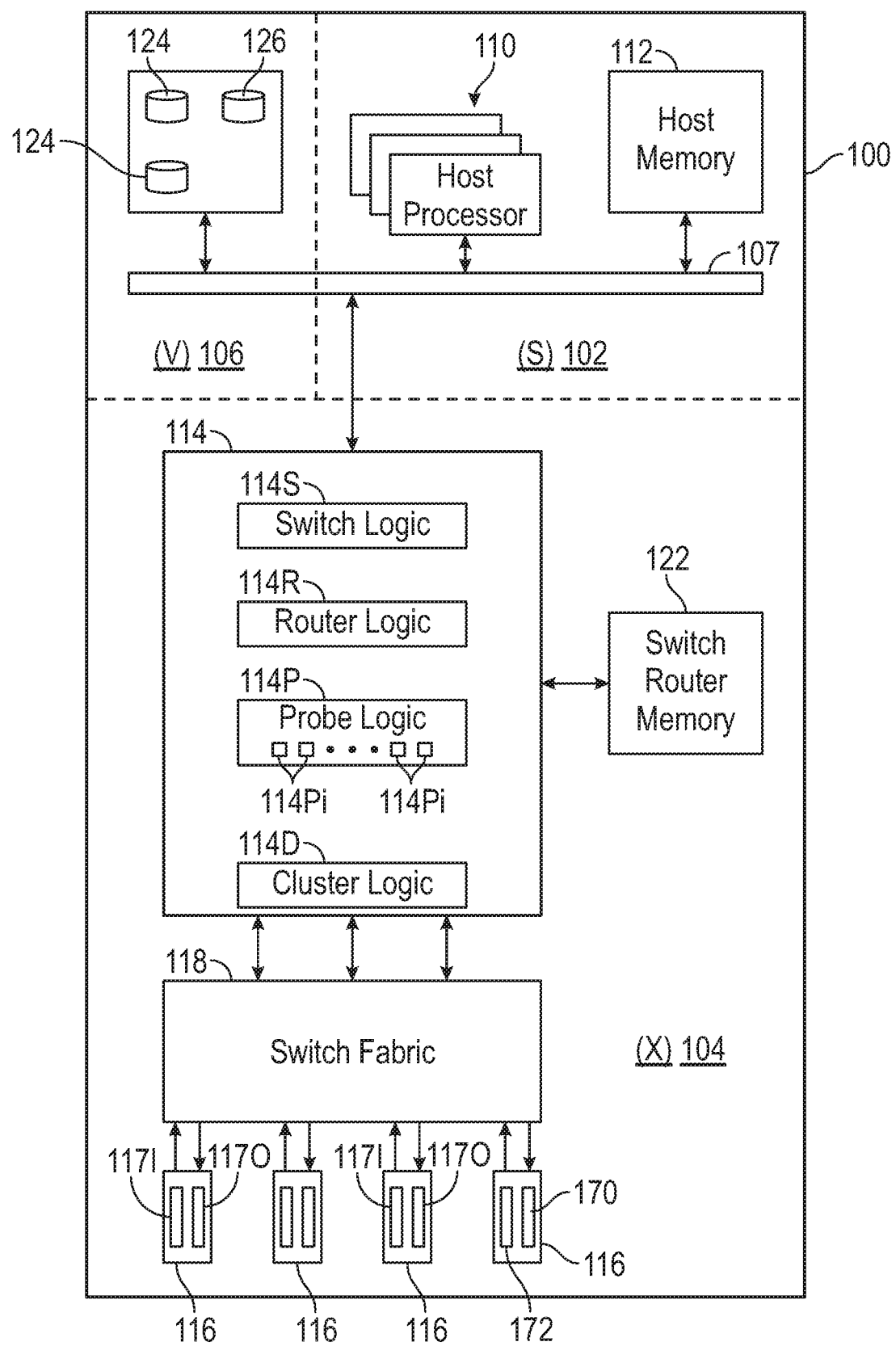
FIG. 1 is an illustrative block diagram of a data center hardware instance in accordance with some embodiments.

A data center comprises numerous physical compute instances, such as physical devices, that may be clustered to share data center functions. Components of multiple different instances may be simultaneously probed to produce probe vectors that include data value sequences that indicate status of components of different instances at a sequence of time increments. The probe vectors may indicate occurrences of events. One or more snapshot data structures that include multiple snapshots containing different subsequences of the data value sequences leading up to one or more events may occur and that represent the simultaneous physical states of multiple components of multiple nodes within one or more clusters within a data center network during a set of series of time intervals leading up to an occurrence of one or more events. The one or more data structures may act as machine learning training data to train an inference engine to predict events based upon probe data gathered during real-time data center operation.

In one aspect, a system is configured to produce training data set for training an inference engine to predict events in a data center. The system includes at least one processor and at least one memory storage device. The storage device includes instructions stored that are accessible to, and executable by, the at least one processor. First instructions, when executed, produce multiple probe vectors corresponding to multiple respective components of at least one data center hardware (DCH) instance. The probe vectors include time ordered sequences of data elements. Data elements have values indicative of status of a respective component corresponding to the probe vector during a corresponding sequence of time increments. The probe vectors indicate an occurrence of one or more events at one or more respective components corresponding to the one or more probe vectors and indicate one or more times of occurrence corresponding to the one or more events. Second instructions produce a set of training snapshots. Multiple respective training snapshots of the set of training snapshots include respective subsequences of data elements from the one or more of the probe vectors. The subsequences of data elements include respective last data elements that correspond to a time increment that occurred not later than an indicated time of occurrence corresponding to at least one of the one or more events.

DESCRIPTION OF EMBODIMENTS

A. Introduction

In some embodiments, a data center network (DCN) 200 may be built incrementally of functionally identical physical compute instances that may be implemented as data center hardware (DCH) instances 200a-200f that each includes a server 102, a network circuit 104, and a storage volume 106. The network circuits of the individual hardware instances 200a-200f may be configured to individually manage their own onboarding to the DCN 200. Containerized applications may be deployed, managed, and scaled to define both server-level services and network-level services provided by clusters of data center hardware instances, thus simplifying data center management. The network circuit 104 of DCH node instances may act as a cluster of nodes to deploy and manage a containerized network-level application to share network-related tasks. Each network circuits hosts a containerized application instance on a common host operating system. The DCN 200, therefore, removes the typical layers on top of layers abstraction that has become the norm in data centers in general, thus also simplifying data center management.

The network circuits participating in a cluster of nodes to deploy and manage a containerized network-level application, produce probe data 702 indicative of node events. The probe information may be used to generate a collection of probe vectors 800 indicative of network-related events within DCN 200. Self-labeled labeled probe vector snapshot training data may be produced based upon the probe vectors. An inference engine may use the snapshot training data to predict occurrences of network conditions of interest. As used herein, the term 'snapshot' refers to a subsequence of data elements of one or more probe vectors corresponding to a subsequence of time increments spanned by the one or more probe vectors.

B. Data Center Hardware Instance

FIG. 1 is an illustrative block diagram of a data center hardware (DCH) instance 100 in accordance with some embodiments. The DCH instance 100 includes a host server (S) 102, a network switch/router circuit (hereinafter 'network circuit') (X) 104, a persistent storage volume (V) 106 and a communication bus 107 to interconnect them. The host server 102 includes a host processor system 108 that may include one or more host CPUs 110 and a host server memory 112 coupled to communicate over the bus 107. The host memory 112 may include executable instructions and data used to configure the host CPUs 110 to provide application workflow services, for example. The network circuit 104 includes a network controller 114 that includes configurable switch logic 114S to determine switching of packets among multiple physical interface ports 116 including input queues 117I and output queues 117O of a switch fabric 118 and that includes configurable router logic 114R to determine routing of packets transmitted onto a network, configurable probe logic 114P to monitor packet flow and probe for occurrence of network events and includes container deployment and management logic 114D ('container logic 114D') to manage containers deployed within a cluster of DCH instances, and in some embodiments, also within generic machines coupled thereto. In some embodiments, the network controller 114 may include instructions in a storage device 122 to configure it to implement functions of the switch logic 114S, router logic 114R, probe logic 114P, and the container logic 114D. The probe logic 114P may instantiate multiple probe logic instances 114Pi to produce corresponding probe vectors. In some embodiments, the network controller 114 may include one or more hardware CPUs (not shown) to perform one or more of switching, routing, monitoring, and container-related functions. Alternatively, the network controller 114 may comprise a software application residing in the compute resources available from the host server 102. The network circuit 104 also includes a network data storage memory 122 coupled to store the network performance-related information. In some embodiments, the network circuit 104 may be implemented as one or more an application specific integrated circuit (ASIC). The storage volume 106 may include disk storage 124 and/or Flash storage 126, for example.

The DCH instance 100 may act individually as an individual data center. More particularly, the DCH instance 100 includes a server (S) to provide application services, a storage volume (V) to provide information used to provide the services and a switch/router (X) to communicate information packets with client devices (not shown). Thus, the functionality of a typical data center may be encapsulated within a single DCH instance 100, for example.

C. Data Center Hardware Instance Network—Physical Components

Figure 2:
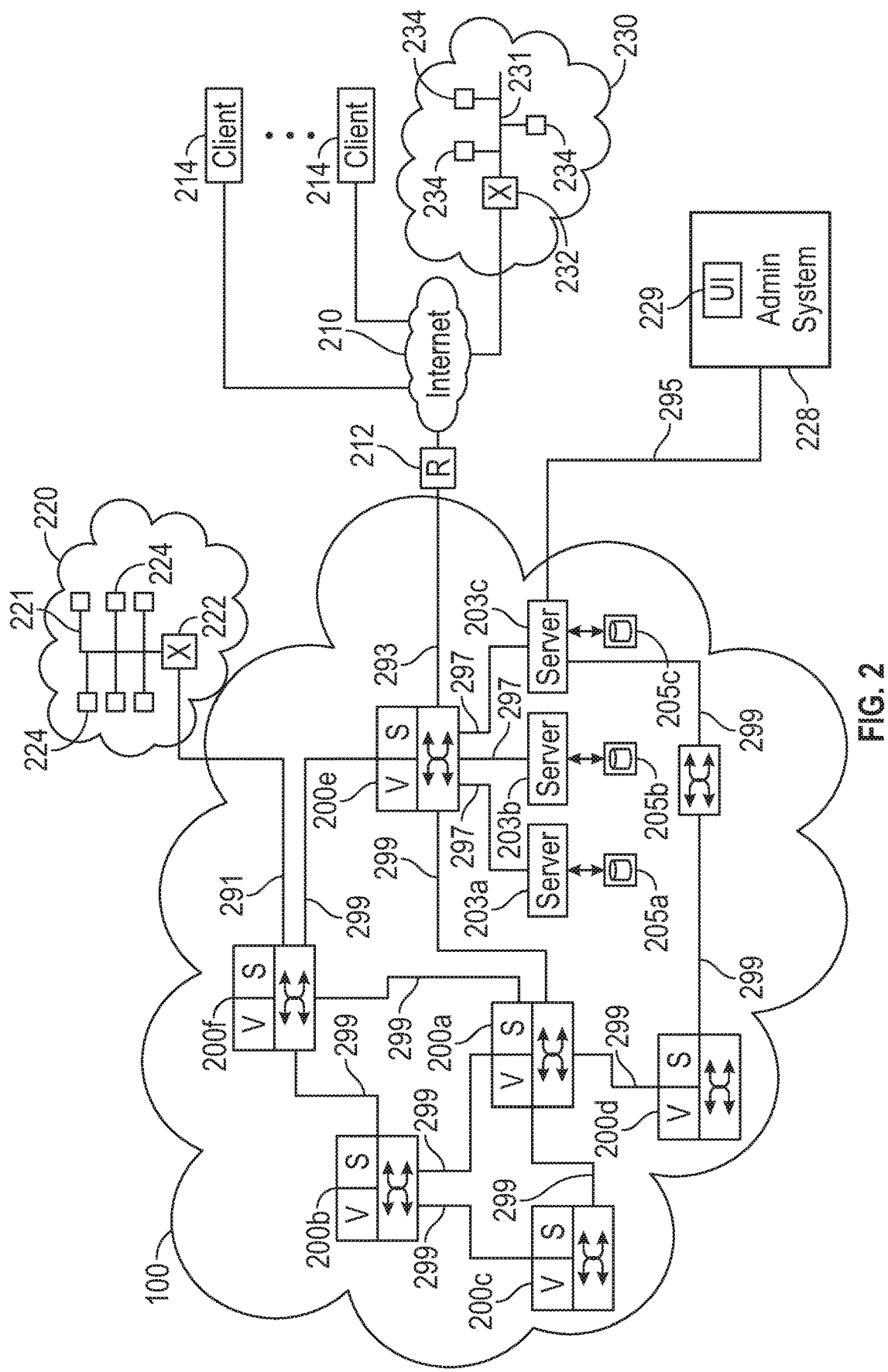
FIG. 2 is an illustrative representation of an example data center network (DCN) including a network of data center hardware instances, in accordance with some embodiments.

FIG. 2 is an illustrative representation of an example data center network (DCN) 200 that includes a network of DCH instances, in accordance with some embodiments. The DCN 200 includes multiple DCH instances 200a-200f coupled via network connections 299 in a packet-switched or routed network. As explained more fully below with reference to FIG. 5, the network circuit 104 portions of the DCH instances 200a-200f may be configured to act as a 'cluster' of 'nodes, and therefore, the DCH instances also may be referred to herein as 'nodes'. Each DCH instance 200a-200f may be configured as described in FIG. 1 to include a server (S), a network circuit (X) and a storage volume (V). The switch/routers (X) may be configured to implement an Ethernet packet-switched and/or IP routed network protocol. The switch/routers (X) also may be configured to support an MPLS protocol or a VXLAN protocol. An administrator computing device 228, coupled to server 203a via a network connection 295, includes an administration user interface (UI) 229 to monitor DCN activity and to reconfigure components of the DCN 200 in response to changes in application workflow demands, for example. As explained more fully below, in some embodiments, reconfiguration of both servers (S) and switch/routers (X) may be achieved through distribution and management of containerized services. Different DCH instances may be configured to have different levels of compute, storage, and switch/router capabilities.

The example DCN 200 also includes a generic (e.g., conventional) switch/router 201, and generic servers 203a, 203b, 203c coupled via network connections 297 to respective generic storage volumes 205a, 205b, 205c coupled as shown in FIG. 2, which may be referred to herein as 'generic' components. A commonality among the DCH instances 200a-200f and the generic components 201, 203a-203c, 205a-205c is that they run a common operating system, which in some embodiments includes the native Linux operating system. In the example DCN 200, the generic servers 203a-203c and their storage volumes 2005a-2005c are coupled to the DCH 200e, which may operate to configure them to act as nodes within a cluster, as explained more fully below, in which they share their compute and storage capabilities with DCH 200e to which they are coupled.

The DCN 200 may be configured to send and receive information packets over the Internet 210. A routing device 212 coupled to DCH 200e via network connection 293, for example, may be configured to send and receive packets over the Internet 210 between the DCN 200 and one or more first client devices 214, such as laptop computers or mobile computing devices. The DCN 200 also may be configured to send and receive packets between a first private network 220 that includes a first local network 221, such as a LAN for example, to communicate packets with second client devices 224 coupled to the first local network. A switch/router 222 coupled to DCH 200f via network connection 291, which may act as a firewall, for example, may couple packets between DCN 200 and one or more of the second client devices 224. The DCN 200 also may be configured to send and receive packets between a second private network 230 that includes a second local network 231, such as a second LAN for example, to communicate packets with third client devices 234 coupled to the second local network 231. A switch/router 232, which may act as a firewall for example, may couple packets between the Internet 210 and one or more of the third client devices 234.

Commonly owned U.S. patent application Ser. No. 15/476,664, filed Mar. 31, 2017, entitled, Heterogeneous Network in a Modular Chassis; commonly owned U.S. patent application Ser. No. 15/476,673, filed Mar. 31, 2017, entitled, Priority Based Power-Off During Partial Shutdown; and commonly owned U.S. patent application Ser. No. 15/476,678, filed Mar. 31, 2017, entitled, Modular Chassis with Fabric Integrated into the Line Card, which are expressly incorporated herein in their entirety by this reference, disclose an implementation of a distributed data center network 200, in accordance with some embodiments.

The multiple DCH instances 200a-200f are configured to act in concert with the DCN 200. More particularly, the individual servers (S), the individual storage volumes (V) and the individual network circuits (X) of the multiple DCH instance 200a-200f act together to communicate information packets with client devices 214, 224, and 234. The overall capacity of the DCN 200 may be dynamically scaled by incrementally coupling a larger number of DCH instances to increase service capacity and by incrementally coupling a smaller number of DCH instances to reduce service capacity.

Each DCH instance 200a-200f includes the container logic 114D, which includes embedded system software to streamline addition of the instance to the DCN 200. In some embodiments the container logic 114D may configure the network controller 114 to manage onboarding of an instance to the DCN 200. From first power-on of a newly added DCH instance, the embedded container logic 114D manages network discovery, download and configuration of operating system software (e.g., native Linux), and of the embedded system, logic 114D, itself. The container 114D may configure a DCH to participate in a cluster of machines cooperating in the management of containerized applications. The container logic 114D also may configure generic servers, such as generic servers 203a-203c, coupled to a DCH, such as DCH 200e, to participate in a cluster of machines cooperating in the management of containerized applications. The switching/routing/container capability is exposed to the operating system, e.g., Linux, as an operating system resource, e.g., as a Linux resource, that any standard application can already take advantage of without being aware that it is running on a DCH instance. Thus, the switching/routing/container logic can run on such DCH or generic machine without modification to the DCH's or machine's underlying operating system. With an embedded operating system running within its network controller 114, a network circuit (X) 104 component of a DCH instance 100 may install and self-configure itself to join a cluster of DCH instances coupled in the DCN 200 and configured to collaboratively serve a containerized network-related application, for example.

D. Containers

Figure 3:
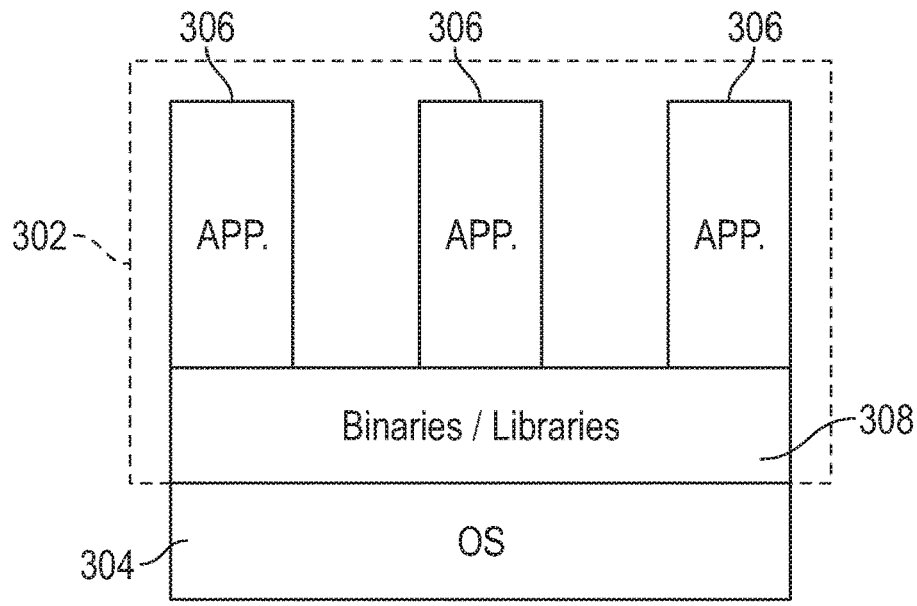
FIG. 3 is an illustrative drawing representing an example container running on a host operating system.

FIG. 3 is an illustrative drawing representing an example container 302 running on a host operating system 304. A container 302 includes multiple application service instances 306 plus the binaries and libraries 308 to access computer resources (e.g., CPU and RAM) required to run the application services on the host operating system 304. More particularly, the example container 302 includes virtualized instances of the application services 302 instantiated within a kernel of an operating system 304. Container 302 separates the application services 306 from the operating system 304 and the physical infrastructure (not shown) that it uses to connect to a network. The application instances 306 running within the container 304 can see only the operating system resources allocated to them. In accordance with some embodiments, the allocated operating system resources may allow containers to have access to physical networking resources as opposed to having access only to virtual resources.

In general, containers may be used to run distributed applications with low overhead by sharing operating system resources. Several containers may be instantiated within an operating system kernel with a subset of a computer's resources being allocated to each such container. An application may be packaged as a collection of one or more containers. An application may be provided to a user as a high-level system as a service (SaaS). Spreading an application and its services over many containers provides better redundancy, better portability, and provides the application the ability to serve a larger number of users. Within a single container there can be multiple building-block applications such software packages/libraries, tools, etc. that help form the higher-level application. Containers may be created and distributed among servers of a data center network on-demand for efficient workflow management in response to an increase in requests for application services and may be terminated in response to a decrease in requests for application services.

E. Container Deployment and Management

Figure 4:
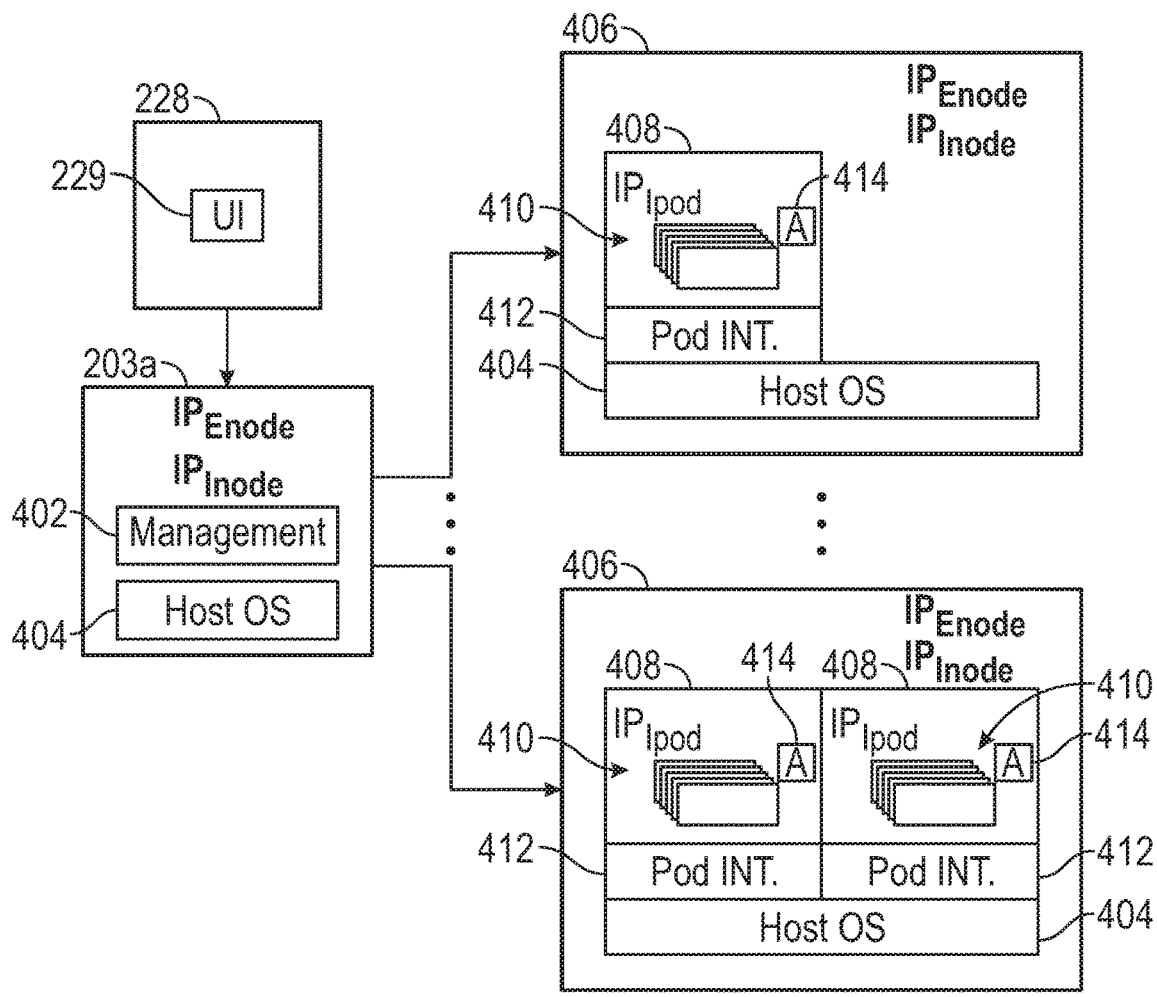
FIG. 4 is an illustrative block diagram representing a system to deploy and manage containers.

FIG. 4 is an illustrative block diagram representing a system to deploy and manage containers. The following description uses terminology typically used to describe the 'kubernetes' platform to automate container operations by way of example, although other styles of container automation platforms to deploy and manage containers may be used consistent with the principles disclosed herein. Kubernetes is an open source system for managing containerized applications across multiple hosts, providing basic mechanisms for deployment, maintenance, and scaling of applications. (See, https://kubernetes.io/docs/home.) The kubernetes platform coordinates a cluster of machines, referred to as 'nodes' to work as a single unit. Containerized applications may be deployed to a cluster without tying them specifically to individual nodes. The applications may be packaged as containers to decouple them from individual hosts. Kubernetes automates the distribution and scheduling and scaling of application containers across a cluster of nodes.

A master device, such as a generic server 203*a* (or one of the DCH instances 200*a*-200*f* or one of the other generic servers 203*b*-203*c*) may be configured to provide a container deployment and master module 402 that runs on an instance of a host operating system 404. In an alternative embodiment, a master "device" can be implemented as a distributed service that spans more than one server and/or DCH. One or more worker nodes 406 each includes one or more pods 408 that each includes one or more containers 410 that run on an instance of the host operating system 404. As used herein, a 'node' refers to a worker machine, which may be a physical, such as one of the DCH instances 200*a*-200*f*, or virtual machines (not shown), which may be instantiated on one or more of them. As used herein a 'pod' refers to refers to a group of one or more containers deployed to a single node. Containers 410 within a pod share worker node resources, such as CPU and RAM, for example. An administrator machine, such as administrator computer 228 may provide commands indicating a desired deployment definition state to the master device/computer 203*a* to schedule and run containers on nodes comprising physical or virtual machines. The master device/computer 203*a* coordinates the cluster of nodes, 406. It controls the actual deployment scheduling and running of groups of containers within one or more pods 408 within one or a cluster of nodes 406 according to the deployment definition provided by the administrator computer 228. It also controls replication of a deployment in the event that one or more nodes becomes unavailable.

A pod 408 may provide an interface layer 412 between containers 410 and the operating system 404. The interface layer 412 may be used to schedule container workloads and to allocate shared CPU, switch/router and storage resources among the containers 410. The interface 412 also may make it easier to migrate containers among nodes. Each pod 408 includes an agent 414 to report status information about the containers 410 within the pod 408 to the master device/computer 203*a*, which may provide status to the administrator computer 228.

A node typically includes an external IP address ($IP_{Enode}$) that is externally routable (available from outside the cluster) and an internal IP address ($IPI_{node}$) that is routable only within the cluster. Containers 408 grouped within a pod 408 share an internal IP address ($IP_{Ipod}$). The master/computer 203*a* may define a virtual subnet on which the master 203*a* may communicate with pods 408 and containers 410 on which containers 410 may communicate with each other using their internal IP addresses, to distribute workloads for example.

The master/computer 203*a* monitors status of the deployed pods 408 and containers 410. It may respond to differences between an actual deployed status and the desired deployment definition state by making corrections such as automatically adding a node to replace a node that has gone offline and to automatically create new pods and containers to automatically replace the pods and nodes of the node that has disappeared, for example. The master/computer 203*a* may provide load balancing services to distribute workflow among containers 410, for example.

F. Data Center Hardware Node Clusters—Containerized Applications

Figure 5:
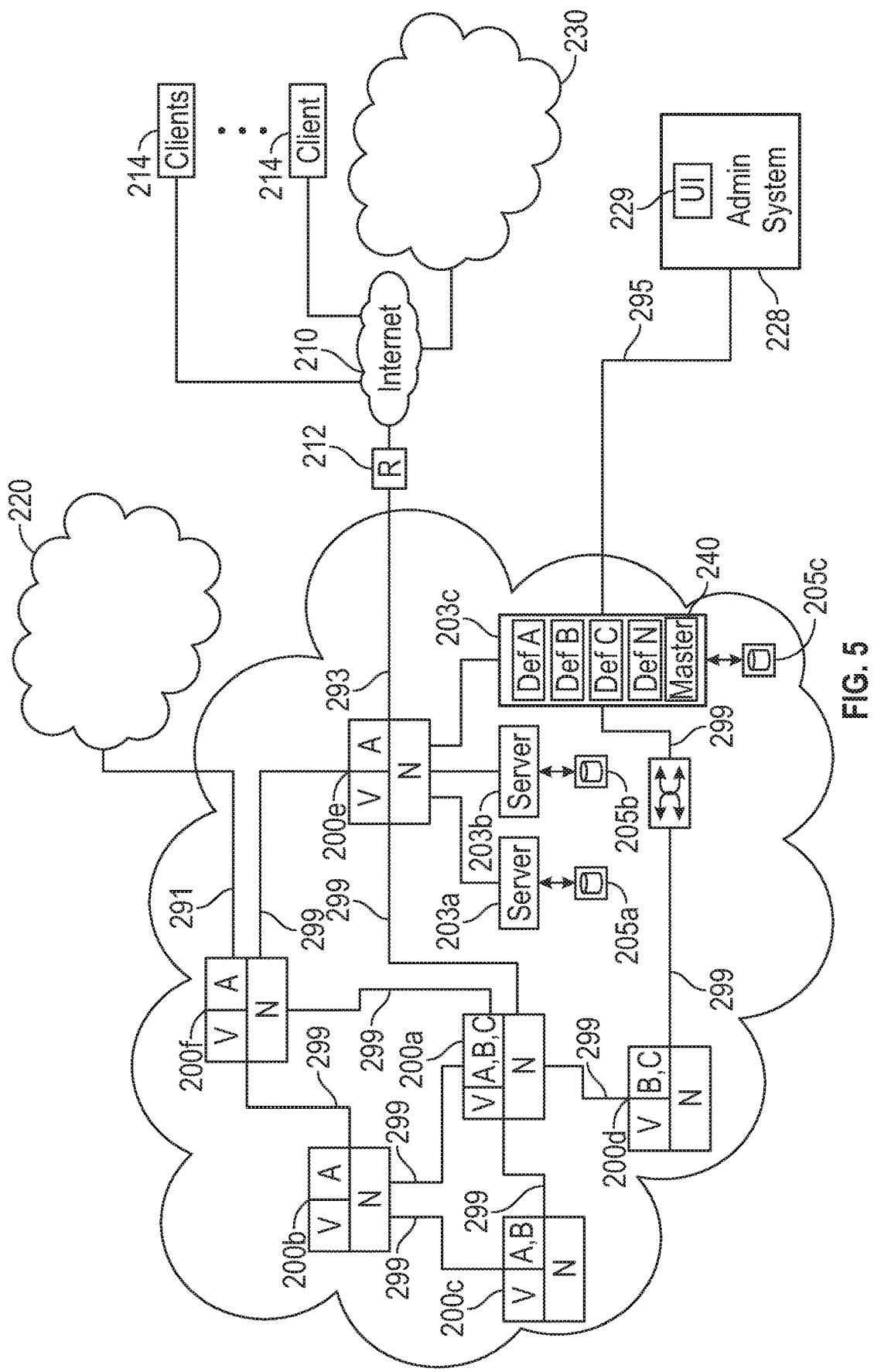
FIG. 5 is an illustrative representation of the example DCN of FIG. 2 configured with containers, in accordance with some embodiments.

FIG. 5 is an illustrative representation of the example DCN 200 of FIG. 2 configured as a cluster of nodes with containerized applications, in accordance with some embodiments. The servers (S) of the DCH instances 200*a*-200*f* are configured with containers to provide application services to one or more of the example clients 214, 224, 234. The containers A, B and C may run on CPUs 108 of physical servers (S) 102 of one or more of the DCH instances, either directly or on virtual machines (not shown). The containers N may run on the network controllers 114 of the switch/routers circuits (X) 104 of the of the DCH instances.

The administrator computer 228 may be configured to provide commands indicating deployment definitions A-C and N for respective containers, A, B, C and N to server 203*a*, which may be configured to act as a master device. More specifically, a master device/server 203 may be configured with master module 240, which uses deployment definitions A-C and N to manage deployment scheduling and running and scaling of containers A, B, C and N. In accordance with some embodiments, any of the DCH devices or generic servers within 200 may be configured to act as a master module. Moreover, the master module can be a distributed service that spans across multiple servers and/or DCH. Thus, a master module need not be a fixed, dedicated, specialized machine. If a machine acting as a master module fails, then any of the DCH or generic servers can pick up the master function.

In the example DCN 200, the master module 240 uses definition A to manage the configuration of a first cluster of DCH instances including 200*a*, 200*b*, 200*c*, 200*e* and 200*f* to host instances of containers with application service 'A' (container A). Generic server 203 also is configured to run container A. The master module 240 uses definition B to manage the configuration of a second cluster of servers of DCH instances including 200*a*, 200*c* and 200*d* to host instances of containers with application service 'B' (container B). The master module 240 uses definition C to manage the configuration of a third cluster of servers of DCH instances including 200*a* and 200*d* to host instances of containers with application service 'C' (container C). The master module 240 uses definition N to manage the configuration of a fourth cluster of switch/routers (X) of DCH instances including 200*a*-200*f* and generic machines 203*b*, 203*c*, to host instances of containers with application service 'N' (container N), for example.

Containers A, B and C may provide server-level container-based business, personal or entertainment services, for example. Containers N provide network-level container-based services. Definition N may be employed to deploy and manage containers that provide network services in the same way, e.g., as described with reference to FIG. 4, that other application level services and microservices are deployed and managed.

G. Monitoring and Probing Network Performance

The network circuits (X) 104 of the DCH instances 200a-200f of the DCN 200 are situated in the networking paths of data center traffic. Also, generic servers 203a-203c, coupled to DCH 200e, are situated in the networking paths of data center traffic. The probe logic 114P of the individual DCH instances monitors and records network traffic for occurrences of events of interest. Multiple probe logic instances 114Pi may be created within a network circuit 104 to probe multiple different components such as different hardware elements or different application programs (including microservices) running on a given DCH, for example. The containerized application N may be distributed by the master device 203a according to definition N to configure individual network circuits 104 to implement the probe logic 114P. As explained more fully below, a network definition N may configure a DCH to include probe logic 114P not only to access cluster data but also to parse, curate, aggregate and store the data. For example, individual probe logic instances 114Pi may sample packets to collect statistical data from the packet headers, i.e. to determine what is flowing through the DCH instances 200a-200f. Probe logic to probe for events of interest may be configured by an administrator. In some embodiments, the network circuit of each DCN has access to approximately 15,000 data points per second.

Figure 6:
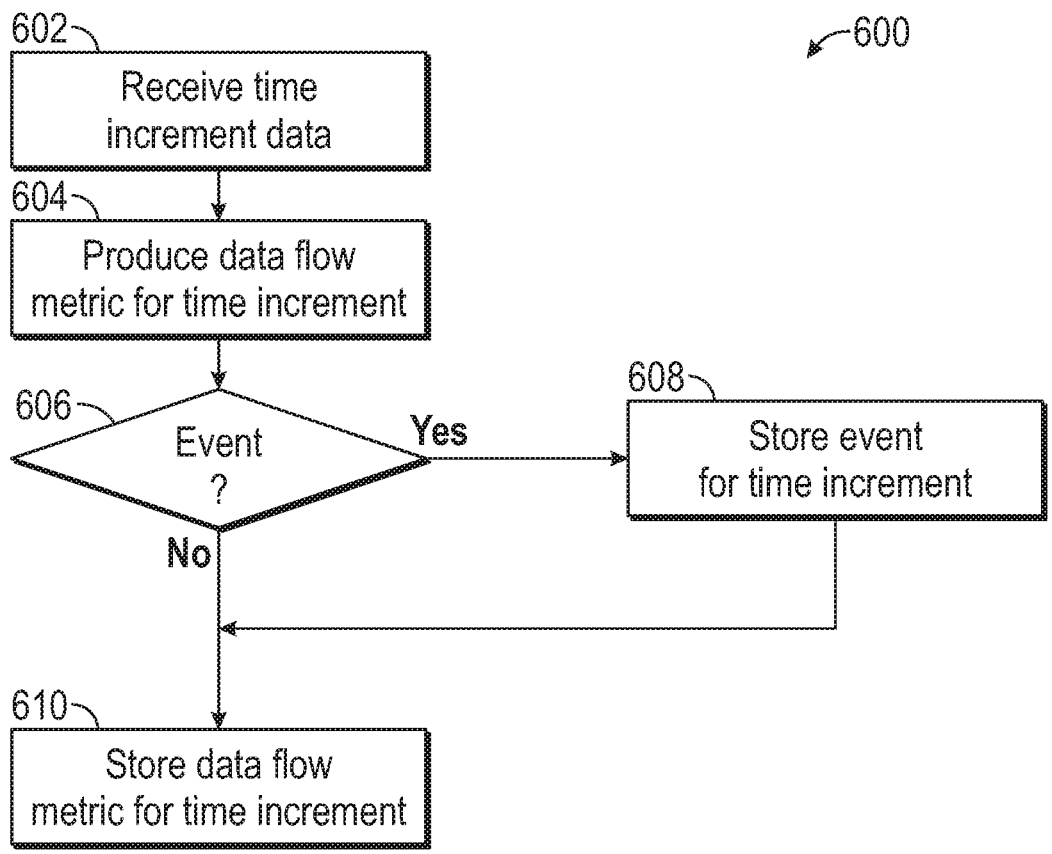
FIG. 6 is an illustrative first flow diagram representing a way to configure a probe logic instance to monitor and store network traffic data and occurrences of events, in accordance with some embodiments.

FIG. 6 is an illustrative first flow diagram 600 representing a way to configure a probe logic instance 114Pi to monitor and store network traffic data metrics and occurrences of events, in accordance with some embodiments. The network controller 114 may be configured according to program instructions to monitor and store network traffic data metrics and occurrences of events according to the process of FIG. 6. The data traffic metrics may indicate status of DCH components during each of an ordered sequence of time increments. It will be appreciated that the probe logic instances 114Pi may be configured to provide a multiplicity of different implementations of the first flow 600, each directed to producing metrics and events for a different DCH component. The individual network controllers 114 of the network circuits 104 of the DCH instances 200a-200f may be configured according to the first flow diagram F00. A first probe block 602 receives network data received over the DCN 200 by the network controller 114 of a DCN for a time increment. In some embodiments, receiving the data may include receiving the network packets according to a network protocol, for example. In some embodiments, the time increment may be every second, and that increment may be increased or reduced depending on the type of events and the tradeoff between precision and resource (compute/storage) utilization, for example. A second probe block 604 produces network data flow metrics, for the time increment. The second probe block 604 may parse, curate, and/or summarizes the received data to produce the network data flow metrics. For example, a probe logic instance 114Pi may be configured according to an implementation of the second block 604 to provide a counter to count the number of data frames in a queue and to produce a metric value indicating a percent of the queue filled for the time increment, for example. A queue percent metric value may serve as an indication of a queue-fill status indicative of whether the number of frames in the queue will soon surpass some threshold number, for example. Alternatively, a probe logic instance 114Pi may be configured according to an implementation of the second block 604 to provide two or more counters to monitor queue depth in two or more different queues and to produce a metric value indicating a variance in the number of frames in the two or more queues. The variance metric value may serve as an indication of a load balance status of the two or more queues indicative of whether the variance will soon exceed some variance threshold, for example. A third probe decision block 606 monitors the metrics for an occurrence of a prescribed condition during the time increment. Continuing with the above examples, if a number of frames in the queue surpassing some threshold number may constitute an occurrence a prescribed condition and a variance in the number of frames in different queues surpassing a threshold may constitute a load balance event, for example. In response to an occurrence of an event during the current time increment, probe block 608 stores within storage device 122 an indication of the occurrence of the event for the current time increment. Following block 608 or following decision block 606, in response to a determination that no event has occurred during the current time increment, control flows to probe block 610, which stores the network data flow metrics for the current time increment.

Each network controller 114 may be configured to implement multiple different probe logic instances 114Pi, each different probe logic instance receiving a different portion of the network data within the DCN 200 and produces and stores different network data flow metrics and event occurrences indicative of network data flow at its portion of the DCN 200. Additional examples of data flow metrics that may be produced and stored by different probe logic instances 114Pi include port utilization, queue depth, queue drops, error counts and drop counts at various points in a data pipe line, forwarding tables, address utilization, and cluster network topology indicating how the nodes are interconnected and partitioned and how application instances are grouped within individual nodes. Additional examples of events of interest include, queue drops, load balancing exceeding a variance threshold, drop rate exceeding a prescribed threshold, protocol heath check failing, and latency exceeding a prescribed threshold. Another example is to look at the headers of sampled packets to determine what IP addresses are coming and going; comparing against historical data anomaly can be flagged as possible security breach or attack.

Figure 7:
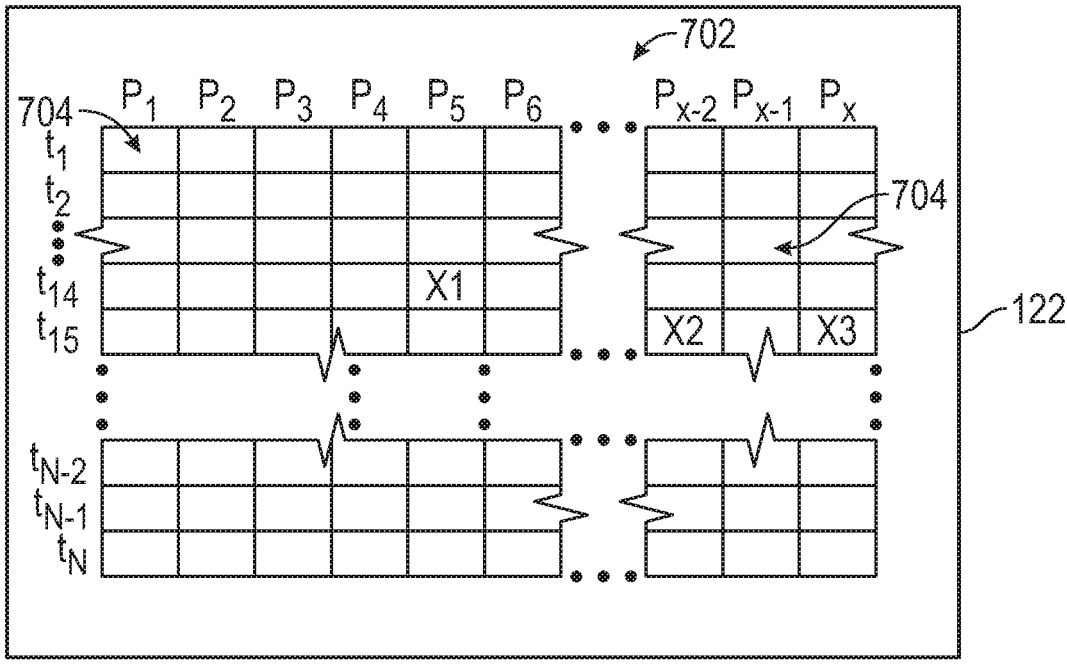
FIG. 7 is an illustrative drawing representing network data storage memory instance and example probe data structure stored therein, in accordance with some embodiments.

FIG. 7 is an illustrative drawing representing a data storage memory instance 122 that embodies example probe vectors $P_1$-$P_X$ 702 stored therein, in accordance with some embodiments. The probe vectors $P_1$-$P_X$ are data structures that include corresponding time ordered sequences of data elements 704 stored for a series of time increments $t_1$-$t_N$. For example, each of probe vectors $P_1$-$P_X$ includes a corresponding time ordered series of data elements 704 at time increments $t_1$-$t_N$. The probe logic instance 114Pi may provide a different instance of the flow 600 of FIG. 6 for each probe time series data set $P_1$-$P_X$. More particularly, for example, different probe vectors $P_1$-$P_X$ may include different time series of data elements that include data metrics indicative of different events and also may include corresponding indicia of occurrences of one or more different events.

A DCH probe logic instance may be configured to produce a probe vector corresponding to a port component of a DCH (or generic server), and a respective probe logic instance (not shown) configured according to the first flow 600 of FIG. 6 may produce a probe vector Pi indicative of port utilization at each time increment of time series $t_1$-$T_N$, for example. A DCH probe logic instance may be configured to produce a probe vector corresponding to a depth of a queue component of a DCH (or generic server), and a respective probe logic instance (not shown) configured according to the first flow 600 may produce a fourth probe vector $P_4$ indicative of queue depth at each time increment of time series $t_1$-$T_N$, for example. A DCH probe logic instance may be configured to produce a probe vector corresponding to queue drops by a queue component of a DCH (or generic server), and a respective probe logic instance (not shown) configured according to the first flow 600 of FIG. 6 may produce a fifth probe time series data set $P_5$ indicative of whether, for each time increment $t_1$-$T_N$, there has been a queue drop, for example. A first 'X1' marker within the fifth probe vector $P_5$ indicates a queue drop at time increment $t_{14}$ i.e. at probe/time combination ($P_5$, $t_{14}$). A DCH probe logic instance may be configured to produce a probe vector corresponding to comparative computation loads of components of a DCH (or generic server). For example, an X-2 probe logic instance (not shown) configured according to the first flow 600 of FIG. 6 may produce an X-2 probe vector $P_{X-2}$ indicative of whether, for each time increment $t_1$-$T_N$, a load balance has exceeded a variance threshold, for example. A second 'X2' marker within the X-2th probe vector $P_{X-2}$ indicates that load balancing exceeded a variance threshold at time increment $t_{15}$ i.e. at probe/time combination ($P_{X-2}$, $t_5$). A third marker 'X3' within the Xth probe vector $P_X$ indicates an occurrence of a detection of an intrusion event at time $t_{15}$ i.e. at probe/time combination ($P_X$, $t_{15}$).

Thus, as explained more fully below, the individual DCHs that participate in a cluster may use their local CPU resources to locally perform gathering and curation of network data to produce probe vectors before sending the probe vectors to an aggregation point for a broader view of data of the cluster. As a result, processing of data corresponding to multiplicity of probes scales automatically with size of the cluster, since every DCH node includes CPU resources. This approach differs from a centralized model where a "central" compute is scaled separately as a cluster size grows. In accordance with some embodiments, pre-processing of network data by DCHs produces probe vectors, which provide detailed records of local events, and a collection of probe vectors produced by a multiplicity of DCHs, in turn, acts as pre-processed data that provides a global picture of network behavior that may be used in training of a network management system to manage the DCN 200, for example. As explained below with reference to FIG. 14, once an inference engine 1404 is trained based upon the probe vectors, the inference engine 1404 may predict occurrences of events in real time based in response to new data 1416

H. Aggregating Monitor Time Series Data Sets and Probe Time Series Data Sets The network circuits (X) 104 of the DCH instances 200a-200f of the DCN 200 are configured to publish their respective probe vectors P1-PX to the master device 203a. In some embodiments, a master device, used for collection of probe data, can also be a service spanning multiple servers or DCHs. Moreover, a master used for data collection need not be the same master used for coordinating containers. As explained above, in a kubernetes environment, containers 410 may be grouped within pods 408 that include agents 414 to report status information about of the containers 410 within the pods 408 to the master device/computer 203a. More particularly, in some embodiments in which the master 203a configures a cluster of DCH instances 200a-200f to host a containerized application 'N' (container N) that implements the probe logic 114P, an agent 410 at each switch/router 104 reports probe vectors $P_1$-$P_X$ to the master device 203. Moreover, in accordance with some embodiments, generic servers 203a-203c also may be configured to report network data back to the nearest DCH, such as DCH 200e in the illustrative example, which may use the process 600 to produce probe vectors that include metrics and identify events corresponding to the data reported by the generic servers.

Figure 8:
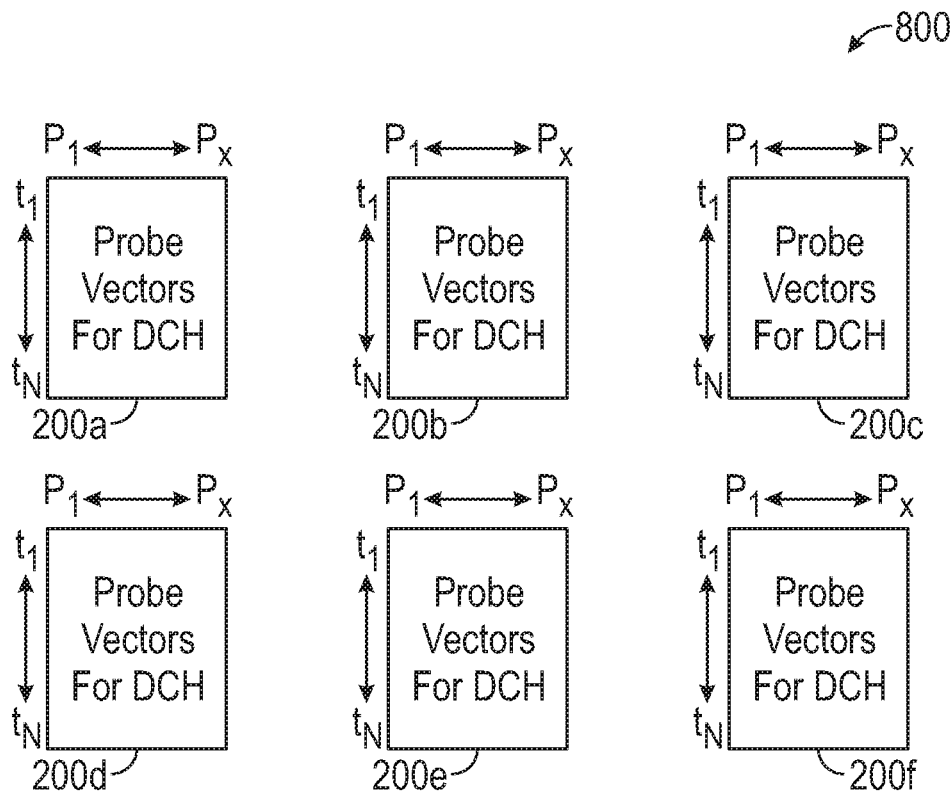
FIG. 8 is an illustrative drawing representing an example time series of vectors, in accordance with some embodiments.

FIG. 8 is an illustrative drawing representing an example collection of probe vectors 800 for a plurality of DCHs, in accordance with some embodiments. Each column in FIG. 8 represents a probe vector across the time interval $t_1$-$t_N$. Each probe vector represents a data set that includes a time series of metrics and that may include indicia of an occurrence of one or more events. Thus, for example, each probe vector may provide state information indicative of functional state of an individual DCH 200a-200f or of a generic server 203a-203c e.g., port utilization, queue depth, queue drops, error counts and drop counts at various points in a data pipe line, forwarding tables, address utilization. Collectively, the collection of probe vectors 800 may provide an indication of the network state across an entire cluster of nodes at each time interval $t_1$ to $t_N$. Thus, the overall state of a cluster, in terms of the collective states of multiple physical components of the cluster, can be observed across time.

Figure 9:
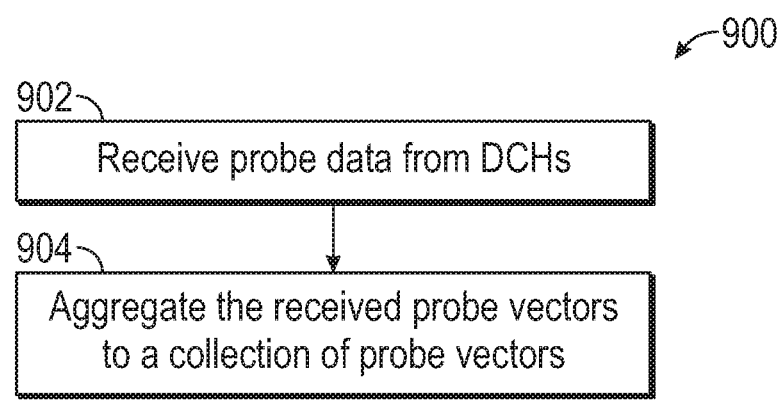
FIG. 9 is an illustrative third flow diagram representing a way to configure a master device to gather probe vectors from a cluster of data center hardware instances to produce the time series vectors, in accordance with some embodiments.

FIG. 9 is an illustrative third flow diagram 900 representing a way to configure a master device 203a to gather probe vectors 702 from a cluster of DCH instances 200a-200f instances, in accordance with some embodiments. A first probe gather block 902 receives probe data 702 from each a network controller component 114 of each of the DCH instances 200a-200f of the DCN 200. The master device 203a configures the DCH instances 200a-200f to act as a cluster of nodes to host instances of application N in accordance with a definition N. The DCH instances 200a-200f, acting in their role as nodes of the cluster, publish their probe data 702 to the master device 203a. A second probe gather block 904 aggregates the received probe data 702 to produce the collection of probe vectors 800.

Referring again to FIG. 8, the illustrative example collection of probe vectors 800 provide multi-dimensional time series data in which each probe vector represents a dimension that includes a time series of data values. The multi-dimensional time series data provided by the collection of probe vectors may provide information that may be used to indicate how nodes are interconnected and partitioned, how are network traffic loads balanced between nodes, where are the congestion points in a cluster, what type of traffic/flows are going through the cluster, for example. As explained more fully below, the collection of probe vectors 800 collected during real-time operation may be used to train an inference engine 1404 to predict occurrences of network events.

I. Detecting Network Conditions in Real-Time

The probe vectors 702 correspond to components of physical hardware DCH instances. Individual DCH instances 200a-200f include hardware components, such as ports, queues, tables, or pipelines. Individual DCHs may host virtual machines, which include virtual components, such as ports, queues, tables, or pipelines, which are hosted components of the DCH, for example. Individual DCH instances 200a-200f include software components, such as application programs or containers that may implement application sub-functions or microservices, for example. The probe logic instances 114Pi of individual DCHs locally produce probe vectors indicative of network-related activity at the individual DCHs. A collection of probe vectors 800 gathered from the individual DCHs provide the multi-dimensional data that collectively includes data to provide values indicative of network-related functions that that occur within or between physical hardware DCHs acting as nodes of a cluster, e.g., queue drops, load balancing, queue drop rate, protocol heath check, and packet latency.

Referring back to FIG. 2 and FIG. 5, an administrator may observe multi-dimensional data at the UI 229 of the administration system 228. An administrator may observe status of the DCN 200, or more specifically, the status of the cluster of nodes 200a-200f, by observing values within the multi-dimensional data 800, via direct threshold or algorithm monitoring, for example. In operation, multi-dimensional data 800 may include dimensions that, if observed by network administrator personnel in real-time, may cause serious concern if not downright panic, which may prompt immediate corrective action to be taken such as redirecting traffic elsewhere, shutting down parts of cluster, debugging, isolation, and/or other mitigation techniques. From the multi-dimensional data 800, an administrator can pick out a time increment or a series of time increments and analyze all or a subset of the dimensions within one or more time increment to trouble shoot network-related errors (e.g., drops, unreachable nodes/services, high latency) or optimize for network-related as well as non-network-related performance (e.g., better load balance by changing a network communications-related algorithm, better utilization of resources by moving applications around, better use of bandwidth by partitioning the cluster network differently, better use of storage by moving data to different tiers of cache).

Referring again to FIG. 7, an administrator may observe a queue drop event represented by first 'X1' marker at ($P_5$, $t_{14}$) in real-time via UI 229 and take corrective action after the occurrence of the event, for example. Similarly, an administrator may observe load balancing exceeded a variance threshold represented by the second 'X2' marker at ($P_{X-2}$, $t_{15}$) and take corrective action after the occurrence of the event, for example. Also, an administrator may observe an intrusion event represented by the third 'X3' marker at ($P_X$, $t_{15}$) and take corrective action after the occurrence of the event, for example. However, as described more fully below, knowing conditions within the DCN 200, such as the time series values of one or more probe vectors, that precede an occurrence of one or more events may permit an administrator to predict the occurrence of the one or more events before they happen again so as to take corrective action to avoid actual reoccurrence of the one or more event. More particularly, machine learning based upon time series data within probe vectors leading up to a previous occurrences of one or more events may be used by an inference engine 1404 later, in real time, to identify an occurrence of a pattern of time series data within one or more probe vectors that may provide a basis to predict another occurrence of the one or more events in advance so that corrective action may be taken before the occurrence of the one or more events.

Figure 10A:
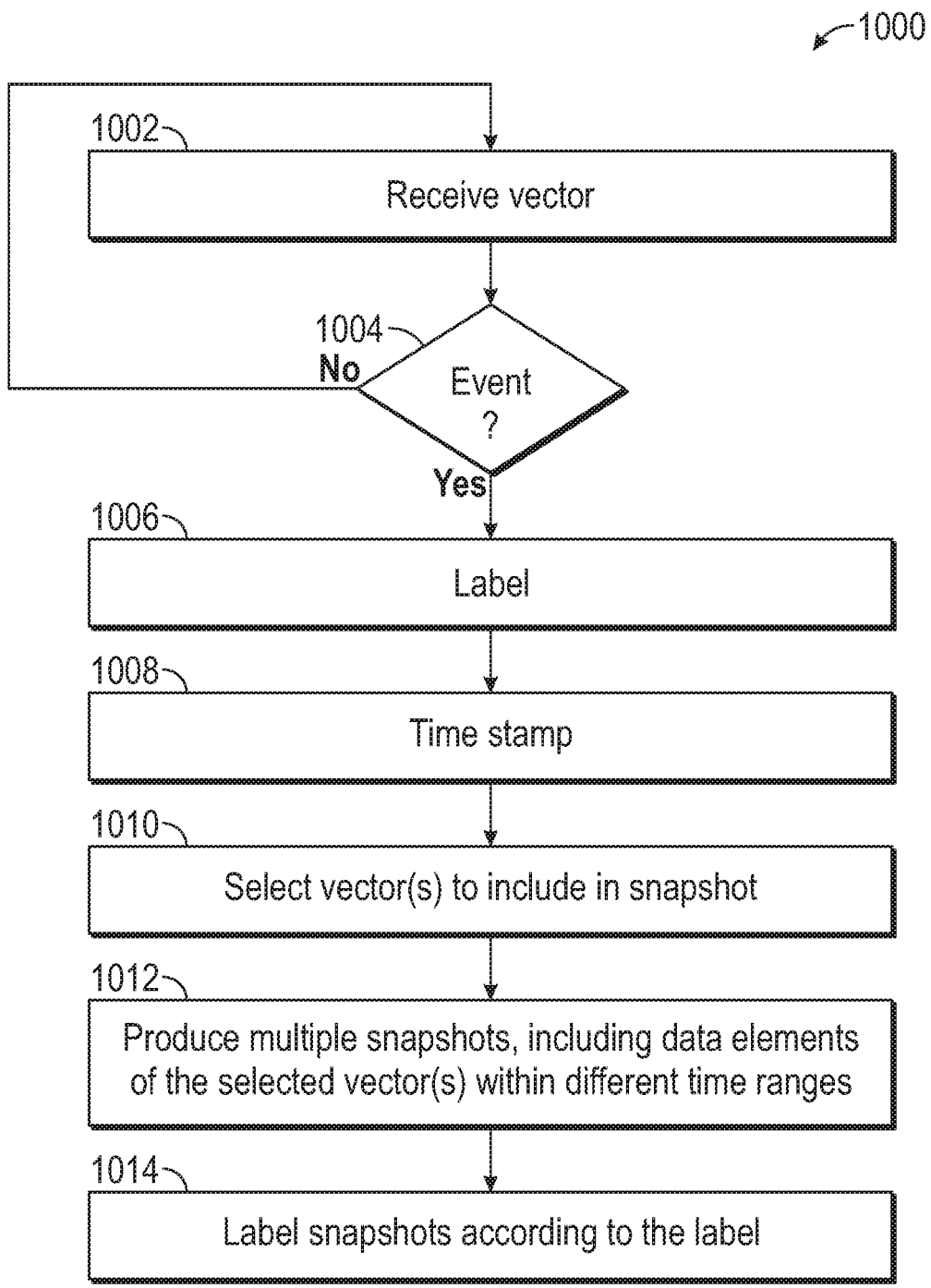
FIG. 10A is an illustrative fourth flow diagram representing a way to configure a computer system to produce self-labeled training data, in accordance with some embodiments.

J. Self-Labeling Training Data for Machine Learning to Predict Network Conditions FIG. 10A is an illustrative fourth flow diagram 1000 representing a way to configure a computer system to produce self-labeled training data, in accordance with some embodiments. A DCH or a server may be configured according to program instructions to produce self-labeled training data according to the process of FIG. 10A. As explained more fully below with reference to FIG. 13, a machine learning engine 1402 may be configured to train an inference engine 1404 based upon the self-labeled training data, to predict a network condition in advance rather than after it already has occurred. A first block 1002 receives a probe vector. For example, the first 1002 may receive the probe vector Pi of FIG. 7. A second decision block 1004 determines whether one or more values within the currently received probe vector indicates an occurrence of a condition of interest, such as an event. In response to determination that no condition of interest has occurred, then control flows back to the first block 1002 training probe vector snapshots 1002, which may receive a next probe vector such as probe vector $P_2$, for example. However, in response to a determination of an occurrence of a condition of interest, then control flows to a third block 1006, which associates a label with the received vector to name the identified condition. In accordance with some embodiments, a label identifies an occurrence of an event. For example, if the currently received probe vector is the example probe vector $P_5$, then the second decision block 1004 may determine that the currently received probe vector, $P_5$, indicates a queue drop event at time $t_{14}$, and the third self-label block 1006 may associate a label 'queue drop' with the currently received probe vector time series data element ($P_5$, $t_{14}$). The label also may indicate the component associated with the event, e.g., which queue and a node associated with the event, e.g., which DCH or other server. A fourth block 1008 associates a time stamp marker with the currently received vector. For example, continuing with the illustrative example of labeling the probe vector $P_5$ with a 'queue drop' label, the fourth block 1008 labels probe vector $P_5$ with a time marker indicating time increment $t_{14}$. The fourth self-label block 1008 also may label a currently received vector with other identifying data such as, severity of the predicted condition and/or range of interest. Range of interest may encompass a range in time, a range of nodes, and/or a range of probe vectors (e.g. other columns of interest), for example.

A fifth block 1010 selects one or more probe vectors to include in a set of self-labeled training snapshots. In accordance with some embodiments, for example, the fifth block 1010 may select a collection of probe vectors to be included in a set of training snapshots based upon type of event or based upon co-occurrences of events. A set of training snapshots may include different probe vectors that include different events so as to encompass co-occurrences of events within some time range. For example, detection of an intrusion (e.g. hacker attack), likely correlates heavily to sampled IP addresses and port utilization, but less to load balance variance or storage utilization. In accordance with some embodiments, for example, the fifth block 1010 may select a collection of probe vectors to be included in a set of training snapshots based upon network proximity to a device where an event occurred, for example. Network proximity may be based upon, for example, BGP peers, nodes within a flow path, nodes within the same network namespace, for example. In accordance with some embodiments, for example, the fifth block 1010 may select a collection of probe vectors to be included in a set of training snapshots based upon time proximity to the event. For example, a congestion event likely correlates to data that are only within a few seconds of the event.

A sixth block 1012 produces a snapshot data structure comprising multiple training data snapshots, which include data elements of the selected probe vectors within different ranges that may extend before and up until a time indicated by the time stamp, and also, may include a time indicated by the time stamp. Each snapshot is a data structure, and different snapshots may include time series data elements from the same collection of probe vectors but over different time ranges, and perhaps, for different DCHs. A seventh block 1014 labels the snapshots consistent with the label determined at block 1006. The multiple snapshots may be used by a machine learning system 1502, described below, configured to train an inference engine 1404 to predict a condition, such as an occurrence of an event, identified by the second decision block 1004. Blocks 1010, 1012 may generate multiple training probe vector snapshots for use to train an inference engine 1404 to predict in advance an occurrence of an event.

The training probe vector snapshots are referred to as 'self-labeled' because their labeling arises based upon the second decision block 1004 detecting data within the training data set itself, indicating an occurrence of a condition of interest. In other words, the probe vector itself contains data recognized by the decision block 1004 as indicating that the probe vector is to be used as labeled training data. Thus, the process 1000 identifies a probe vector to be labeled e.g., to indicate an event of interest), and generates multiple corresponding labeled snapshots that may include subsets of a much larger collection of probe vectors or portions thereof, corresponding to different nodes, events, and time series time increments, to assist with training. Moreover, it will be appreciated that a master device 203a may transmit the time series of collection of probe vectors 800 to a separate computer system (not shown) configured according to the fourth flow diagram 1000 to produce the training probe vector snapshots, which need not occur in real-time. In accordance with some embodiments, a "master device" may be implemented as a software process that is distributed within a cluster. Thus, a master device need not be locked to any specific machine, and may have built-in redundancy (i.e. an application/process with multiple containers), so that it may be tolerant to any single machine failure.

It will be appreciated that the data structure includes multiple training snapshots that collectively represent the simultaneous physical state of multiple components of multiple DCHs within one or more clusters within a DCN 200 during a set of time intervals leading up to an occurrence of one or more events. Snapshot data structures may be used, as explained below, to train an inference engine 1404 to predict real-time physical states of multiple components of multiple DCHs within one or more clusters within a DCN 200, over a set of real-time time intervals, that are likely to lead to an occurrence of one or more events. Such prediction may be used as a basis to take corrective action to avert the occurrence of the one or more predicted events.

Figure 10B:
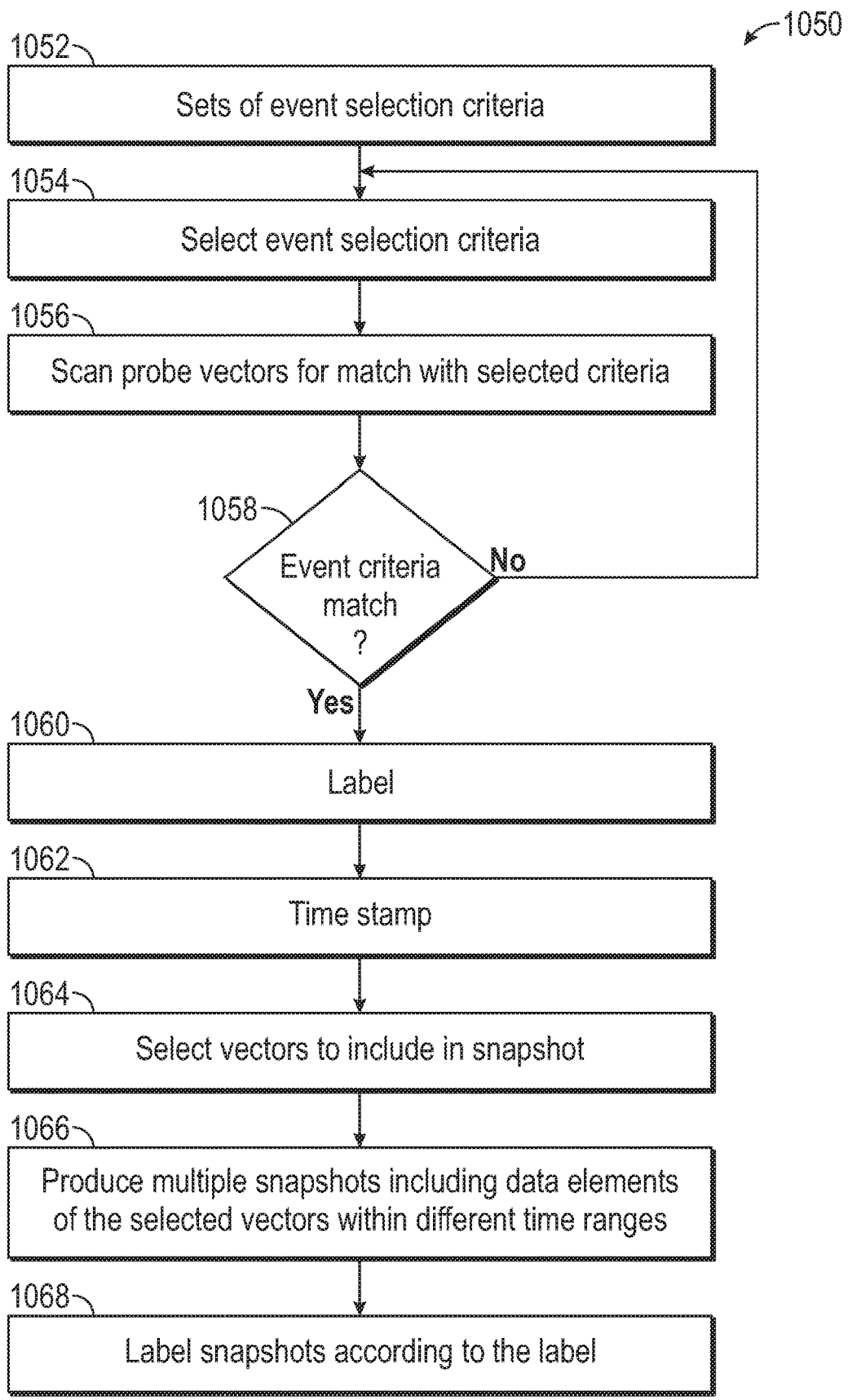
FIG. 10B is an illustrative fifth diagram representing a way to configure a computer system to produce self-labeled training data, in accordance with some embodiments.

FIG. 10B is an illustrative fifth diagram 1050 representing an alternative way to configure a computer system to produce self-labeled training data, in accordance with some embodiments. A DCH or a server may be configured according to program instructions to produce self-labeled training data according to the process of FIG. 10B. As explained more fully below with reference to FIG. 13, a machine learning engine 1402 may be configured to train an inference engine 1404 based upon the self-labeled training data, to predict a network condition in advance rather than after it already has occurred.

A first block 1052 provides in a machine readable storage device multiple different combinations event set selection criteria to select sets of one or more events for which to create training snapshots. The following Table sets forth illustrative example criteria for selection of events. The first block 1052 may be configured to set forth criteria that include combinations that may include one or more of event type, time range, hardware device or software processes, for example.

TABLE

| Event Selection Criteria |
| --- |
| a queue drop event and load balance exceeding a variance threshold event |
| two or more events within three seconds of each other |
| a queue drop event and load balance exceeding a variance threshold event, within a selected time range, such as within five seconds of each other |
| a queue drop event and a load balance exceeding a variance threshold event at any of DCHs200a, 200b and 200c within four seconds of each other |

A second block 1054 selects a set of event selection criteria provided by the first block 1052. A third block 1056 scans the collection of probe vectors 800 of FIG. 8 for an occurrence of one or more events based upon the currently selected event selection criteria. For example, currently selected event selection criteria may instruct the third block 1406 to scan the collection of probe vectors 800 for co-occurrences of a queue drop event and load balance exceeding a variance threshold event. A fourth decision block 1058 determines whether a match exists between currently selected event selection criteria and events within one or more events within the collection of probe vectors 800. If no, then control flows back to the second block 1054, which may select another set of event selection criteria provided by the first block 1052. If yes, then a fifth block 1060 associates a label with the one or more vectors containing events that match the event selection criteria. A sixth block 1062 associates a time stamp marker with a time of occurrence of a latest vector of interest of one or more vectors that match one or more event matching criteria. The training data may include probe vector data elements of the selected/matching probe vectors within different time ranges that may extend before and up until the latest event of interest. However, the label for that training data will reference a combination events rather than a single latest event. Thus, in some embodiments, the sixth block 1062 associates the time stamp marker with a vector probe at a data series element within the probe vector that corresponds in time with occurrence of the latest occurring event from among the one or more matching events. A seventh block 1064 selects one or more probe vectors to include in multiple self-labeled training snapshots. An eighth block 1066 produces multiple snapshots, which include data elements of the selected probe vectors within different ranges at or before the time indicated by the time stamp. The seventh and eighth blocks 1064, 1066 may select probe vectors and produce snapshots in a manner as described above with reference to blocks 1010, 1012 of FIG. 10A, for example. A ninth block 1068 labels the snapshots consistent with the label determined at block 1060. The multiple snapshots may be used by a machine learning system 1402, described below, configured to train an inference engine 1404 to predict a condition, such as an occurrence of a set of events, identified by the second blocks, 1406, 1058.

FIG. 11 is an illustrative drawing representing an example snapshot data structure 1100 including a first set of labeled snapshot training data produced according to the process of FIG. 10A or FIG. 10B, in accordance with some embodiments. Label A 1103, which is a component of the data structure 1100, includes four example snapshots 1102-1108 collectively represent physical state of a component A (not shown) of DCH 200a over a set of time sequences leading up to a queue drop event at component A. The snapshot data structure 1100 includes a timestamp 'T' 1105 at each timestamp component, indicating time of occurrence of an event of interest, which in this case is $t_{14}$, the time of occurrence of event 'X1'. More particularly, a first example self-labeled training snapshot data 1102 component of the snapshot data structure 1100 includes a subsequence of data elements for probe vector $P_5$ for DCH 200a for a time increment range $t_5$ to $t_{13}$. The first snapshot 1102 is associated with example Label A 1103, which may, for example, indicate, 'queue drop at the component A shown) of node 200a. The Label A 1103 may include additional physical hardware identifying information such as an indication of the port of node 200a where the queue drop occurred and/or machine name, port (though this information already may be included as data within the port vector), applications running on that machine, protocols running on that machine, etc. It will be appreciated, however, that data indicating configuration of a machine (e.g., a DCH), unless they are static (like machine name), are likely already themselves vectors in an overall collection of probe vectors. A second example self-labeled training snapshot 1104 component of the data structure 1100 includes a subsequence of data elements for probe vector $P_5$ for DCH 200a for a time increment range $t_1$ to $t_{10}$. The second snapshot 1104 also is associated with Label A. A third example self-labeled training snapshot 1106 component of the data structure 1100 includes a subsequence of data elements for probe vector $P_5$ for DCH 200a for a time increment range $t_1$, to $t_7$. The third snapshot 1106 also is associated with the Label A 1103. A fourth example self-labeled training snapshot 1108 component of the data structure 1100 includes a subsequence of data elements for probe vector $P_5$ for DCH 200a for a time increment range $t_1$ to $t_5$. The fourth snapshot 1108 also is associated with Label A 1103. It is noted that the example time ranges extend to include time intervals up to but not including a time interval $t_{14}$ of occurrence of the queue drop event that corresponds to the data structure 110. While a snapshot data structure may include a time interval of the corresponding event, time intervals occurring prior to such event, training data occurring prior to the event generally are more useful to for training an inference engine 1404 to predict the event.

It is noted that snapshot 1108 includes a subsequence of data elements that includes a last (latest) data element that corresponds to a time increment $t_5$ that is earlier in time than a time increment corresponding to a last data element of snapshots 1102, 1104 and 1106. Snapshot 1106 includes a subsequence of data elements that includes a last data element that corresponds to a time increment $t_7$ that is earlier in time than a time increment corresponding to a last data element of snapshots 1102 and 1104. Snapshot 1104 includes a subsequence of data elements that includes a last data element that corresponds to a time increment $t_{10}$ that is earlier in time than a time increment corresponding to a last data element of snapshot 1102. Thus, the example sequence of snapshots 1102-1108 encompasses the same probe vectors ($P_5$) for the same DCH 200a for four different time intervals, each having a latest time not later than a time of occurrence $t_{14}$ of the event of interest $P_5$.

FIG. 12 is an illustrative drawing representing an example snapshot data structure 1150 including a second set of self-labeled snapshot training data produced according to the process of FIG. 10A or FIG. 10B, in accordance with some embodiments. Label B 1153, which is a component of the data structure 1150, includes four example snapshots 1152-1158 collectively represent physical state of a component B (not shown) of DCH 200a over a set of time sequences leading up to a load balance exceeding a variance threshold event indicated by the illustrative example probe vector $P_{X-2}$ occurring at time $t_{15}$. The snapshot data structure 1150 includes a timestamp 'T' 1155 at each timestamp component, indicating time of occurrence of an event of interest, which in this case is $t_{15}$, the time of occurrence of event 'X2'. More particularly, a fifth example self-labeled training snapshot 1152 component of the data structure 1150 includes a subsequence of data elements for probe vectors $P_1$-$P_5$ and $P_{50}$-$P_X$ for each of DCHs 200a-200f for a time increment range $t_5$ to $t_{14}$. The fifth snapshot 1152 is associated with Label B 1153, which may, for example, indicate, 'load balance exceeding a variance threshold event at component B (not shown) of node 200b. The label may include additional information as described above. A sixth example self-labeled training snapshot 1154 component of the data structure 1150 includes a subsequence of data elements for probe vectors $P_1$-$P_5$ and $P_{50}$-$P_X$ for each of DCHs 200a-200f for a time increment range $t_1$ to $t_{14}$. The sixth snapshot 1154 is associated with Label B 1153. A seventh example labeled probe vector snapshot 1156 component of the data structure 1150 includes a subsequence of data elements for probe vectors $P_1$-$P_5$ and $P_{50}$-$P_X$ for each of DCHs 200a-200f for a time increment range $t_4$ to $t_{13}$. The seventh snapshot 1156 is associated with Label B 1153. An eighth example self-labeled training snapshot 1158 component of the data structure 1150 includes a subsequence of data elements for probe vectors $P_1$-$P_5$ and $P_{50}$-$P_X$ for each of DCHs 200a-200f for a time increment range $t_3$ to $t_{12}$. The eighth snapshot 1156 is associated with Label B 1153. Thus, the example sequences of snapshots 1152-1158 encompasses the same probe vectors ($P_1$-$P_5$ and $P_{50}$-$P_X$) over four different time intervals, each having a latest time not later than a time of occurrence $t_{15}$ of the event of interest $P_{X-2}$, for the same of DCHs 200a-200f.

Figure 13:
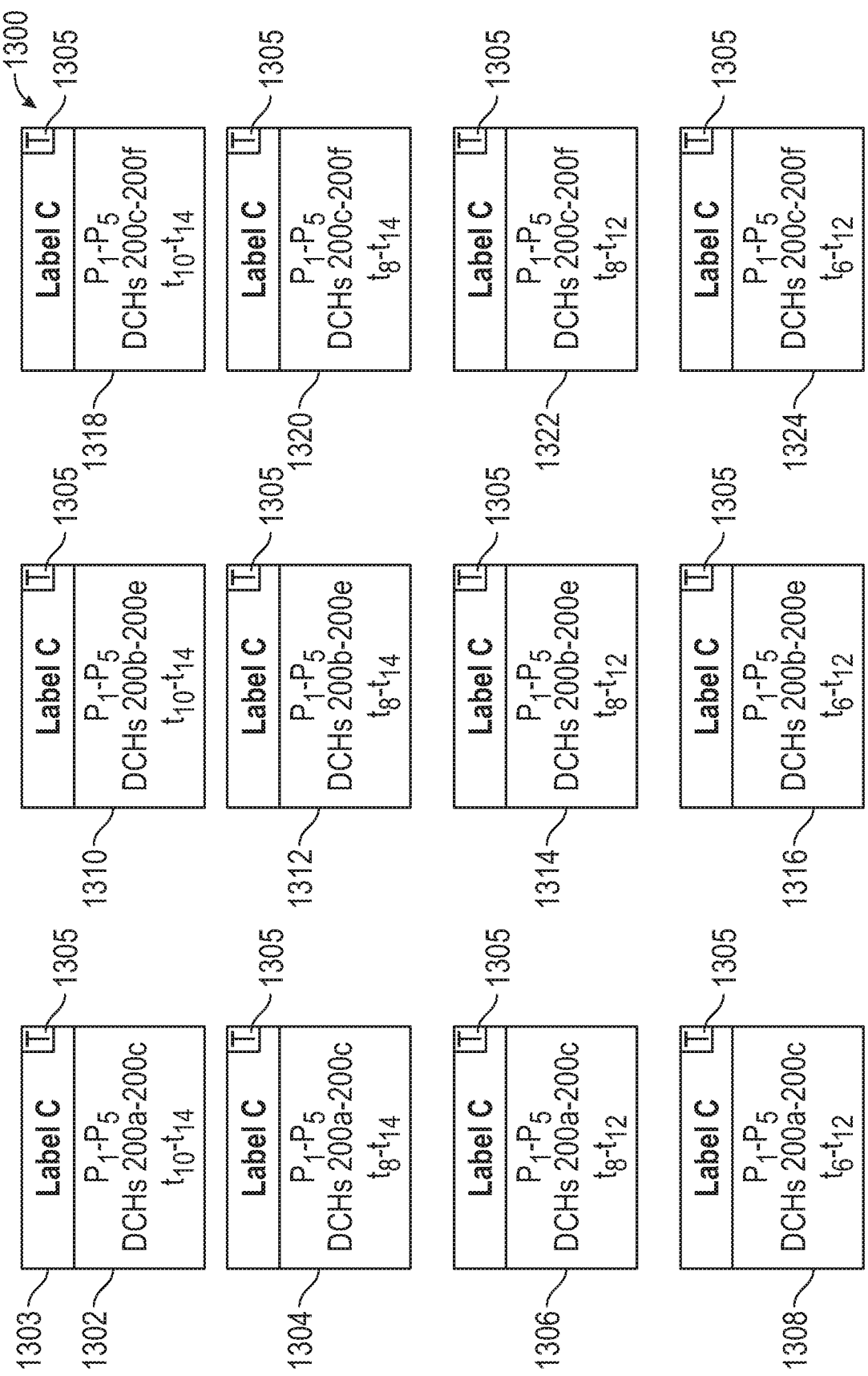
FIG. 13 is an illustrative drawing representing an example snapshot data structure including a third set of self-labeled snapshot training data 1300, in accordance with some embodiments.

FIG. 13 is an illustrative drawing representing an example snapshot data structure 1300 including a third set of self-labeled snapshot training data 1300 produced according to the process of FIG. 10A or FIG. 10B, in accordance with some embodiments. Label C 1303, which is a component of the data structure 1300, includes twelve example snapshots 1302-1304 collectively represent physical state of a component C (not shown) of DCH 200a over a set of time sequences leading up to an intrusion event indicated by the illustrative example probe vector $P_X$ occurring at time $t_{15}$. The snapshot data structure 1300 includes a timestamp 'T' 1305 at each timestamp component, indicating time of occurrence of an event of interest, which in this case is $t_{15}$, the time of occurrence of event 'X3'. More particularly, respective ninth through twelfth snapshot 1302-1308 components of the data structure 1300 includes Label C 1303 and probe vectors $P_1$-$P_5$ for each of DCHs 200a-200c for time increments $t_{10}$ to $t_{14}$, $t_8$ to $t_{14}$, $t_8$ to $t_{12}$ and $t_6$ to $t_{12}$, respectively. Label C 1303 may, for example, indicate, 'detection of an intrusion event at node 200b' and may include additional information as described above. The respective thirteenth through sixteenth snapshot 1310-1316 components of the data structure 1300 includes Label C and probe vectors $P_1$-$P_5$ for each of DCHs 200b-200e for the time increments $t_{10}$ to $t_{14}$, $t_8$ to $t_{14}$, $t_8$ to $t_{12}$ and $t_6$ to $t_{12}$, respectively. The respective seventeenth through twentieth snapshot 1318-1324 components of the data structure 1300 each includes Label C and probe vectors $P_1$-$P_5$ for each of DCHs 200c-200f for time increments $t_8$ to $t_{13}$, $t_7$ to $t_{13}$, $t_6$ to $t_{13}$ and $t_5$ to $t_{13}$, respectively. Thus, the example three sequences of snapshots 1304 to 1308, 1310 to 1316, and 1318 to 1324 each encompasses the same probes ($P_1$-$P_5$) over the same of time intervals time intervals ($t_8$ to $t_{13}$, $t_7$ to $t_{13}$, $t_6$ to $t_{13}$ and $t_5$ to $t_{13}$,) for different combinations of DCHs (DCHs 200a-200c, DCHs 200b-200e, and DCHs 200c-200f) for four different time intervals, each having a latest time not later than a time of occurrence $t_5$ of the event of interest $P_X$.

Time sequence data preceding an event (e.g., time sequence data within one or more probe vectors preceding an event's time stamp) may provide data with a correlation and/or causality to the event. The snapshot data structures 1100, 1150, 1300 are tagged with time stamps and are labeled to indicate a corresponding event. The training snapshots components of the data structures 1100, 1150, 1300 may be used to train an inference engine 1404 to predict occurrences of an events so that preventive action may be taken proactively before the occurrence of the event, for example. For a predicted queue drop event, the preventive action may include redirecting traffic, change load balancing schemes, move applications (containers) to different locations within DCN 200, send flow control to hosts (i.e. servers) or storage targets, rate limit ports, partition the network differently, for example. For a predicted load balancing exceeded a variance threshold event, the preventive action may include changing load balancing schemes, moving applications (containers) to different locations within 200, reassigning IP addressing scheme within DCN 200, partitioning the network differently, for example.

The self-labeled labeled probe vector snapshot training data include probe vector data elements at different time increments for use to train an inference engine 1404 to predict an occurrence of an event in advance. Different snapshots within a set of self-labeled labeled probe vector snapshot training data include different time increment ranges prior to an occurrence of an event. An occurrence of an event at a given time increment may be predictable based upon the time element data of one or more probe vectors prior to the occurrence of the event. A set of snapshot training data includes different time increment ranges that include different last-in-time time increments. Thus, a set of snapshot training data may include a time sequence of snapshots in which snapshots cover different ranges of time increments in which each snapshot in the sequence has a latest time increment that is different from a latest time increment of a next snapshot in the sequence. In some embodiments, each snapshot in a sequence of snapshots has a latest time increment that is earlier in time than a latest time increment of a next snapshot in the snapshot sequence. In some embodiments, each snapshot other than a last snapshot in the sequence, has a latest time increment that is later in time than a latest time increment of a of at least one other snapshot in the sequence. Producing labeled training probe vector snapshots that go too far back in time is unlikely to yield further improvement to the training by a machine learning engine because the data becomes uncorrelated to the event, and may hurt the accuracy and create false positives. Thus, a limit or constraint on how far back in time the training set may be necessary. A tradeoff may be required between prediction accuracy versus how far ahead an inference engine predicts a condition of interest.

The self-labeled labeled probe vector snapshot training data may include data elements from different combinations of probe vectors since some probe vectors may be more predictive of an occurrence of an event than others. Moreover, since the probe vectors can be very large, the training time required by a machine learning algorithm and the compute power required may become too much or too expensive. The amount of data within the multi-dimensional time series vectors that is used for training can be reduced to yield smaller dimensioned training data per time stamp, while maintaining the number of historical time increments to go-back to be included for predictability. Some a priori intelligence may be reasonably applied by an administrator as to which data to include in training a specific to a condition. Labeled training probe vector snapshots size need not be the same for every condition. Thus, although the collection of probe vectors 800 from which the training data is built from may not change, data included for a training set for a particular label/condition may vary.

In some situations, data may be omitted from the probe vectors not just to reduce machine learning converge time, but to improve accuracy. For example, by removing known uncorrelated dimensions from the training data, less "noise" is presented to the machine learning algorithm and more accurate prediction can be made.

K. Machine Learning to Predict Network Conditions

Figure 14:
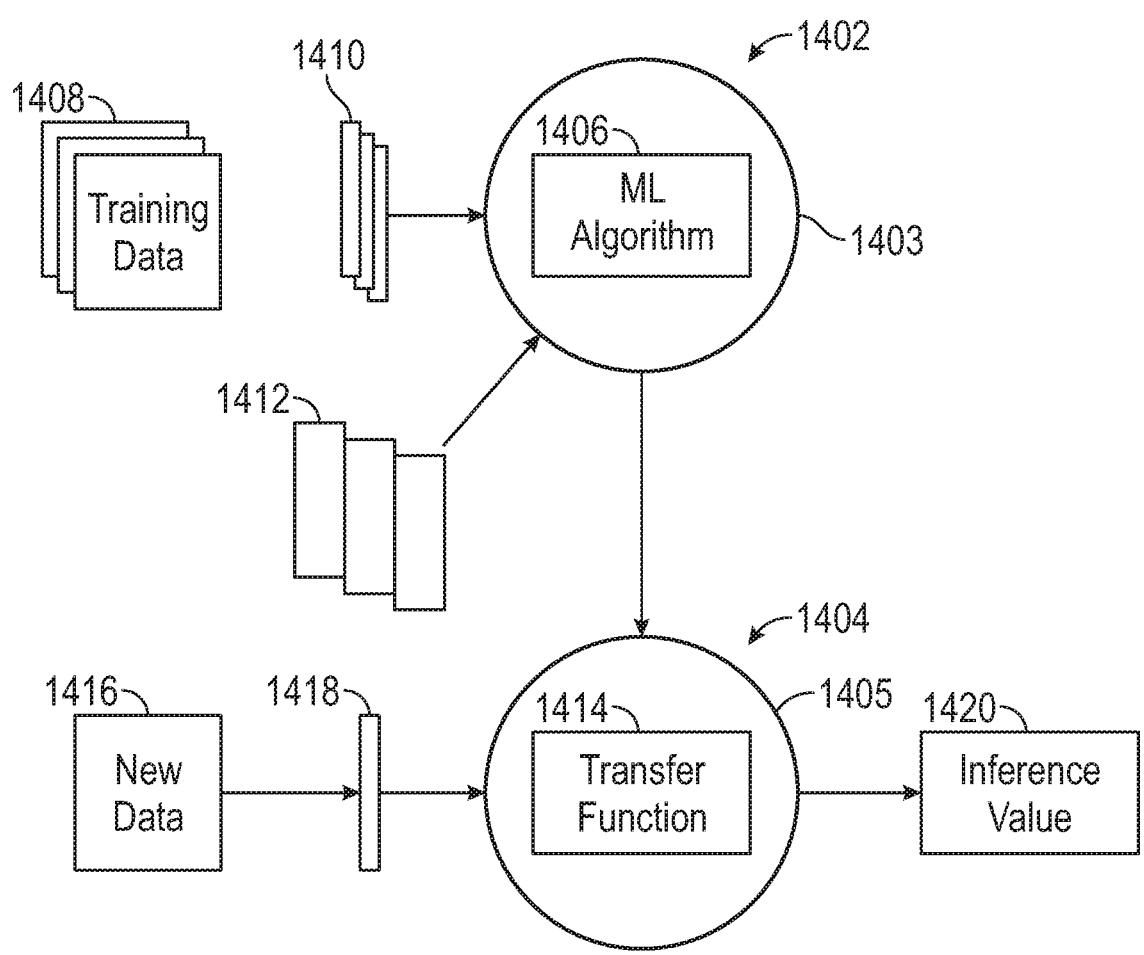
FIG. 14 is an illustrative diagram representing the supervised learning system configured to train the inference engine to predict network conditions based upon labeled training probe vector snapshots, in accordance with some embodiments.

FIG. 14 is an illustrative diagram representing a supervised learning system 1402 configured to train an inference engine 1404 to predict network conditions based upon labeled training probe vector snapshots, in accordance with some embodiments. With the large number of probe vectors generated, which may include tens of thousands per node per second, it may be impossible to perform real-time network analysis in human time to identify an occurrence of a network condition. Also, it may not be possible for a machine to arrive in real-time (e.g., millisecond time scale) with a formulaic proposed action (e.g., an alarm, a warning, a prediction, an action) to a network condition based upon currently available monitor and probe time series data sets. In accordance with some embodiments, machine learning may be applied to learn from the historical data contained within probe vectors to produce an inference model based upon such data to predict occurrences of network conditions. In some embodiments, the inference model may include a transfer function that may receive a multi-dimensional vector as input and may provide an indication of a network condition as an output.

A machine learning engine 1402 may include a computer system 1403 configured according to a machine learning (ML) algorithm 1406. An inference engine 1404 may include a computer system 1405 configured according to a transfer function 1414. The algorithm 1406, such as decision trees, naïve Bayes classification, least square regression, SVM, PCA, ICA, or clustering, for example, to train an event occurrence predicting transfer function 1414 to detect occurrence of an event. The supervised learning system 1402, as shown in FIG. 14, receives labeled training probe vector snapshots 1412. During training, unlabeled training vectors 1410, which may include multiple probe vectors produced over multiple time increments, and labeled training probe vector snapshots 1412 may be input to the ML engine 1402 to train the inference engine 1404. During inferencing, new data 1416. The new data 1416 is 'new' in that it has not been used already for training. The new data 1416 may include real-time probe vector data over multiple time increments, that have been converted to new probe vectors 1418, which are provided to the inference engine 1404 to produce inference values 1420, indicative of predicted conditions, e.g., such as events, based upon the transfer function 1414. In some embodiments, the master device 203a may be configured to include the inference engine 1404. The master device 203a also may be configured to receive new probe vectors 800 as the new data 1416, which includes the new vectors 1418, e.g. new iterations of probe vectors $P_1$-$P_X$ for DCHs 200a-200f. The inference engine 1404 may be trained to predict an occurrence of events described above indicated by markers, X1, X2 or X3, based upon the new probe vectors, for example.

The predicting transfer function may receive multi-dimensional vectors 1418 over a rolling window of multiple time increments as an input, and may predicts whether a condition will or will not occur some number of time increments in the future. If the output is a positive (condition will occur), steps may be taken to avoid the condition before it occurs. Examples of steps/actions that may be taken include changing the load balancing algorithm on one or more boxes, change where an application is deployed, send Ethernet pause frame to a directly attached server or storage device, and shutting down a link.

The above description is presented to enable any person skilled in the art to make and use a system and method for self-labeling training data for a data center cluster of nodes running or hosting applications. Various modifications to the embodiments will be readily apparent to those skilled in the art, and the generic principles defined herein may be applied to other embodiments and applications without departing from the spirit and scope of the invention. In the preceding description, numerous details are set forth for the purpose of explanation. For example, the electrosurgical signal generator circuit may include a single processor configured with instructions to run separate processes to control the sealer stage and the dissection stage. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A system configured to produce training data for training an inference engine to predict events in a data center, comprising:
    at least one processor and at least one non-transitory computer readable medium operably coupled thereto, the non-transitory computer readable medium comprising a plurality of instructions stored in association therewith that are accessible to, and executable by, the at least one processor, where the plurality of instructions comprises:
    first instructions that, when executed, produce multiple probe vectors corresponding to multiple respective components of at least one data center hardware (DCH) instance, respective probe vectors including a time ordered sequences of data elements, respective data elements indicative of status of components corresponding to respective probe vectors during a corresponding sequence of time increments, the probe vectors indicating an occurrence of one or more events at one or more respective components corresponding to the one or more probe vectors and indicating one or more times of occurrence corresponding to one or more events;
    second instructions that, when executed, produce a data structure including training snapshots,
    wherein respective training snapshots include respective subsequences of data elements from one or more of the probe vectors, the respective subsequences of data elements from one or more of the probe vectors including respective last data elements that correspond to respective time increments that not later than an indicated time of occurrence corresponding to at least one of the one or more events.

2. The system of claim 1,
    wherein at least one of the respective subsequences of data elements includes a respective last data element that corresponds to a respective time increment that is later in time than a respective time increment corresponding to a respective last data element of at least one other of the respective subsequences of data elements.

3. The system of claim 1,
    wherein the second instructions that, when executed, label the training snapshots to identify the respective component at which the event occurred.

4. The system of claim 1,
    wherein the second instructions that, when executed, label the training snapshots to identify the event.

5. The system of claim 1,
    wherein at least one of the subsequence of data elements includes a last data element that corresponds to a time increment that is later in time than a time increment corresponding to a last data element of at least two other of the subsequence of data elements.

6. The system of claim 1,
    wherein at least one of the subsequence of data elements includes a last data element that corresponds to a time increment that is later in time than a time increment corresponding to a last data element of at least two other of the subsequence of data elements; and
    wherein at least one of the subsequence of data elements includes a last data element that corresponds to a time increment that is later in time than a time increment corresponding to a last data element of at least three other of the subsequence of data elements.

7. The system of claim 1,
    wherein at least one of the subsequence of data elements includes a last data element that corresponds to a time increment that is later in time than a time increment corresponding to a last data element of at least two other of the subsequence of data elements;
    wherein at least one of the subsequence of data elements includes a last data element that corresponds to a time increment that is later in time than a time increment corresponding to a last data element of at least three other of the subsequence of data elements; and
    wherein at least one of the subsequence of data elements includes a last data element that corresponds to a time increment that is later in time than a time increment corresponding to a last data element of at least four other of the subsequence of data elements.

8. The system of claim 1,
wherein the first instructions, when executed, produce multiple probe vectors corresponding to multiple respective components of at least two DCH instances coupled within a data center network (DCN).

9. The system of claim 1,
wherein the first instructions, when executed, produce multiple probe vectors corresponding to multiple respective components of at least two DCH instances coupled within a data center network (DCN); and
wherein each respective training snapshot includes a subsequence of data elements from each of one or more of the probe vectors of each of the at least two DCHs of the DCN.

10. The system of claim 1,
wherein the first instructions, when executed, configure a first DCH of a DCN to produce multiple probe vectors corresponding to multiple respective components the first DCH;
wherein the first instructions, when executed, configure a second DCH of the DCN to produce multiple probe vectors corresponding to multiple respective components the second DCH; and
wherein each respective training snapshot includes a subsequence of data elements from each of one or more of the probe vectors of each of the first DCH and the second DCH.

11. The system of claim 1,
wherein the first instructions, when executed, configure a first DCH of a DCN to produce multiple probe vectors corresponding to multiple respective components the first DCH;
wherein the first instructions, when executed, configure a second DCH of a DCN to produce multiple probe vectors corresponding to multiple respective components the second DCH; and
wherein the second instructions, when executed, configure a master device to produce the respective training snapshots; and further including:
third instructions, when executed, report over a network to the master device, the multiple probe vectors produced by the first DCH and report over the network to the master device, the multiple probe vectors produced by the second DCH.

12. The system of claim 1,
wherein the first instructions, when executed, produce multiple probe vectors corresponding to multiple respective components of at least two DCH instances coupled within a data center network (DCN);
wherein each respective training snapshot includes a subsequence of data elements from each of one or more of the probe vectors of each of the at least two DCHs of the DCN;
wherein at least one of the subsequence of data elements includes a last data element that corresponds to a time increment that is later in time than a time increment corresponding to a last data element of at least two other of the subsequence of data elements;
wherein at least one of the subsequence of data elements includes a last data element that corresponds to a time increment that is later in time than a time increment corresponding to a last data element of at least three other of the subsequence of data elements; and wherein at least one of the subsequence of data elements includes a last data element that corresponds to a time increment that is later in time than a time increment corresponding to a last data element of at least four other of the subsequence of data elements.

13. A method to produce training data for training an inference engine to predict events in a data center, comprising:
producing by a plurality of probe logic instances at at least one data center hardware (DCH) instance, multiple probe vectors corresponding to multiple respective components of the at least one DCH instance, respective probe vectors including time ordered sequences of data elements, respective data elements indicative of status of components corresponding to the respective probe vectors during corresponding sequences of time increments, the probe vectors indicating an occurrence of one or more events at one or more respective components corresponding to the one or more probe vectors and indicating one or more times of occurrence corresponding to the one or more events; and
producing at a master device a respective data structure including training snapshots,
wherein respective training snapshots include respective subsequences of data elements from one or more of the probe vectors, the respective subsequences of data elements from one or more of the probe vectors including respective last data elements that correspond to respective time increments not later than an indicated time of occurrence corresponding to at least one of the one or more events.

14. The method of claim 13,
wherein at least one of the respective subsequences of data elements includes a respective last data element that corresponds to a respective time increment that is later in time than a respective time increment corresponding to a respective last data element of at least one other of the respective subsequences of data elements.

15. The method of claim 13 further including:
labeling the training snapshots to identify the respective component at which the event occurred.

16. The method of claim 13 further including:
labeling the training snapshots to identify the event.

17. The method of claim 13,
wherein at least one of the subsequence of data elements includes a last data element that corresponds to a time increment that is later in time than a time increment corresponding to a last data element of at least two other of the subsequence of data elements.

18. The method of claim 13,
wherein at least one of the subsequence of data elements includes a last data element that corresponds to a time increment that is later in time than a time increment corresponding to a last data element of at least two other of the subsequence of data elements; and
wherein at least one of the subsequence of data elements includes a last data element that corresponds to a time increment that is later in time than a time increment corresponding to a last data element of at least three other of the subsequence of data elements.

19. The method of claim 13,
wherein at least one of the subsequence of data elements includes a last data element that corresponds to a time increment that is later in time than a time increment corresponding to a last data element of at least two other of the subsequence of data elements;

wherein at least one of the subsequence of data elements includes a last data element that corresponds to a time increment that is later in time than a time increment corresponding to a last data element of at least three other of the subsequence of data elements; and wherein at least one of the subsequence of data elements includes a last data element that corresponds to a time increment that is later in time than a time increment corresponding to a last data element of at least four other of the subsequence of data elements.

20. The method of claim 13,
wherein producing by the plurality of probe logic instances at at least one data DCH instance includes producing multiple probe vectors corresponding to multiple respective components of at least two DCH instances coupled within a data center network (DCN).

21. The method of claim 13,
wherein producing by the plurality of probe logic instances at at least one data DCH instance includes producing multiple probe vectors corresponding to multiple respective components of at least two DCH instances coupled within a data center network (DCN); and
wherein producing at the master device the data structure including training snapshots includes, producing the training snapshots in which each respective training snapshot includes a subsequence of data elements from each of one or more of the probe vectors of each of the at least two DCHs of the DCN.

22. The method of claim 13 further including:
configuring a first DCH of a DCN to produce multiple probe vectors corresponding to multiple respective components the first DCH;
configuring a second DCH of the DCN to produce multiple probe vectors corresponding to multiple respective components the second DCH; and
wherein producing at the master device the data structure including training snapshots includes, producing the training snapshots in which each respective training snapshot includes a subsequence of data elements from each of one or more of the probe vectors of each of the first DCH and the second DCH.

23. The method of claim 13,
configuring a first DCH of a DCN to produce multiple probe vectors corresponding to multiple respective components the first DCH;
configuring a second DCH of the DCN to produce multiple probe vectors corresponding to multiple respective components the second DCH; and
configuring a master device to produce the data structure including the training snapshots; and further including:
reporting over a network to the master device, the multiple probe vectors produced by the first DCH and reporting over the network to the master device, the multiple probe vectors produced by the second DCH.

24. The method of claim 13,
wherein producing by the plurality of probe logic instances at at least one data DCH instance includes producing multiple probe vectors corresponding to multiple respective components of at least two DCH instances coupled within a data center network (DCN);
wherein producing at the master device the data structure including the training snapshots includes, producing the training snapshots in which each respective training snapshot includes a subsequence of data elements from each of one or more of the probe vectors of each of the at least two DCHs of the DCN;

wherein at least one of the subsequence of data elements includes a last data element that corresponds to a time increment that is later in time than a time increment corresponding to a last data element of at least two other of the subsequence of data elements;

wherein at least one of the subsequence of data elements includes a last data element that corresponds to a time increment that is later in time than a time increment corresponding to a last data element of at least three other of the subsequence of data elements; and wherein at least one of the subsequence of data elements includes a last data element that corresponds to a time increment that is later in time than a time increment corresponding to a last data element of at least four other of the subsequence of data elements.

25. A non-transitory computer-readable medium storing instructions that includes an information structure stored in a non-transitory computer-readable medium produced according to a method comprising:
producing multiple probe vectors corresponding to multiple respective components of the at least one DCH instance, each probe vector including a time ordered sequence of data elements, each data element indicative of status of a respective component corresponding to the probe vector during a corresponding sequence of time increments, the probe vectors indicating an occurrence of one or more events at one or more respective components corresponding to the one or more probe vectors and indicating one or more times of occurrence corresponding to the one or more events; and
producing a data structure including training snapshots,
wherein respective training snapshots include respective subsequences of data elements from one or more of the probe vectors, the respective subsequences of data elements from one or more of the probe vectors including respective last data elements that correspond to respective time increments not later than an indicated time of occurrence corresponding to at least one of the one or more events.

26. The non-transitory computer-readable medium of claim 25,
wherein at least one of the respective subsequences of data elements includes a respective last data element that corresponds to a respective time increment that is later in time than a respective time increment corresponding to a respective last data element of at least one other of the respective subsequences of data elements.

27. A non-transitory computer-readable medium storing instructions that, when executed by one or more computer processors of a computing system, cause the computing system to perform operations comprising:
producing multiple probe vectors corresponding to multiple respective components of the at least one DCH instance, each probe vector including a time ordered sequence of data elements, each data element indicative of status of a respective component corresponding to the probe vector during a corresponding sequence of time increments, the probe vectors indicating an occurrence of one or more events at one or more respective components corresponding to the one or more probe vectors and indicating one or more times of occurrence corresponding to the one or more events; and
producing a data structure including training snapshots,
wherein respective training snapshots include respective subsequences of data elements from one or more of the probe vectors, the respective subsequences of data elements from one or more of the probe vectors including respective last data elements that correspond to respective time increments not later than an indicated time of occurrence corresponding to at least one of the one or more events.

28. The non-transitory computer-readable medium of claim 27,
wherein at least one of the respective subsequences of data elements includes a respective last data element that corresponds to a respective time increment that is later in time than a respective time increment corresponding to a respective last data element of at least one other of the respective subsequences of data elements.

\* \* \* \* \*